US012641220B2

(12) United States Patent
Vishwanath et al.

(10) Patent No.: US 12,641,220 B2
(45) Date of Patent: May 26, 2026

(54) METHOD, APPARATUS, AND MEDIUM FOR VIDEO PROCESSING

(71) Applicant: Bytedance Inc., Los Angeles, CA (US)

(72) Inventors: Bharath Vishwanath, Los Angeles, CA (US); Kai Zhang, Los Angeles, CA (US); Li Zhang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/763,908

(22) Filed: Jul. 3, 2024

(65) Prior Publication Data

US 2024/0388692 A1 Nov. 21, 2024

Related U.S. Application Data

(63) Continuation of application No. PCT/US2023/060139, filed on Jan. 5, 2023.

(60) Provisional application No. 63/266,451, filed on Jan. 5, 2022.

(51) Int. Cl.
 *H04N 19/105* (2014.01)
 *H04N 19/176* (2014.01)
 *H04N 19/186* (2014.01)
(52) U.S. Cl.
 CPC ......... *H04N 19/105* (2014.11); *H04N 19/176* (2014.11); *H04N 19/186* (2014.11)

(58) Field of Classification Search
 CPC ... H04N 19/105; H04N 19/176; H04N 19/186
 USPC ...................................... 375/240.02
 See application file for complete search history.

(56) References Cited

U.S. PATENT DOCUMENTS

| | | | | |
|---|---|---|---|---|
| 2018/0063531 A1* | 3/2018 | Hu | ......................... | H04N 19/42 |
| 2020/0396458 A1 | 12/2020 | Francois et al. | | |
| 2021/0314595 A1* | 10/2021 | Zhang | .................. | H04N 19/105 |
| 2025/0330626 A1* | 10/2025 | Jhu | ....................... | H04N 19/176 |
| 2025/0343927 A1* | 11/2025 | Sim | ....................... | G06V 10/751 |

FOREIGN PATENT DOCUMENTS

| | | |
|---|---|---|
| WO | 2020224629 A1 | 11/2020 |
| WO | 2021170058 A1 | 9/2021 |
| WO | 2023133443 A3 | 7/2023 |

OTHER PUBLICATIONS

International Search Report for PCT/US2023/60139, mailed Jul. 10, 2023, 4 pages.

* cited by examiner

*Primary Examiner* — Albert Kir
(74) *Attorney, Agent, or Firm* — Astute IP Law Group

(57) ABSTRACT
Embodiments of the present disclosure provide a solution for video processing. A method for video processing is proposed. The method comprises: determining, during a conversion between a target video block of a video and a bitstream of the video, at least one mapping relationship between a first set of values of a first color component and a second set of values of a second color component; determining a cross-component prediction of the target video block based on the at least one mapping relationship; and performing the conversion based on the cross-component prediction.

19 Claims, 21 Drawing Sheets

550

600

700

Recc

N

N

750

Rec'L

N

2N

800
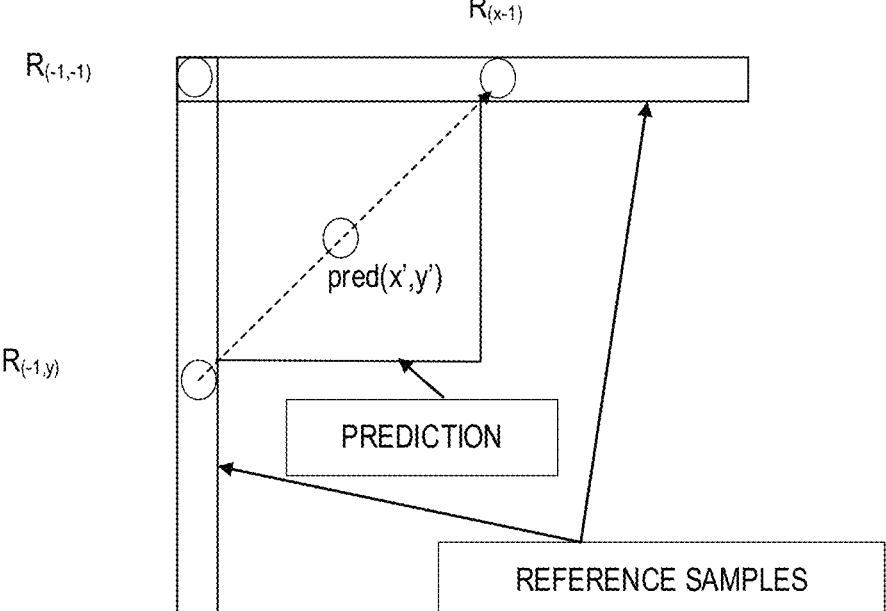
Fig. 8A
820
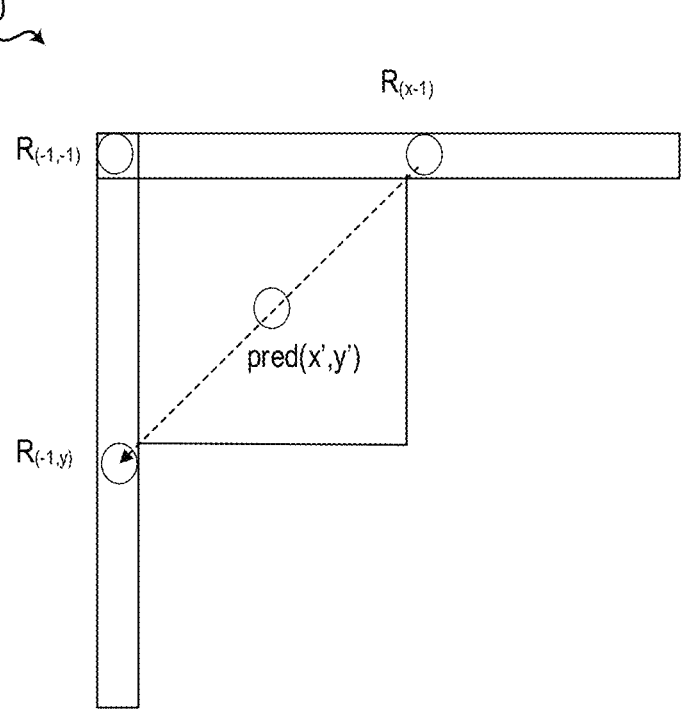
Fig. 8B

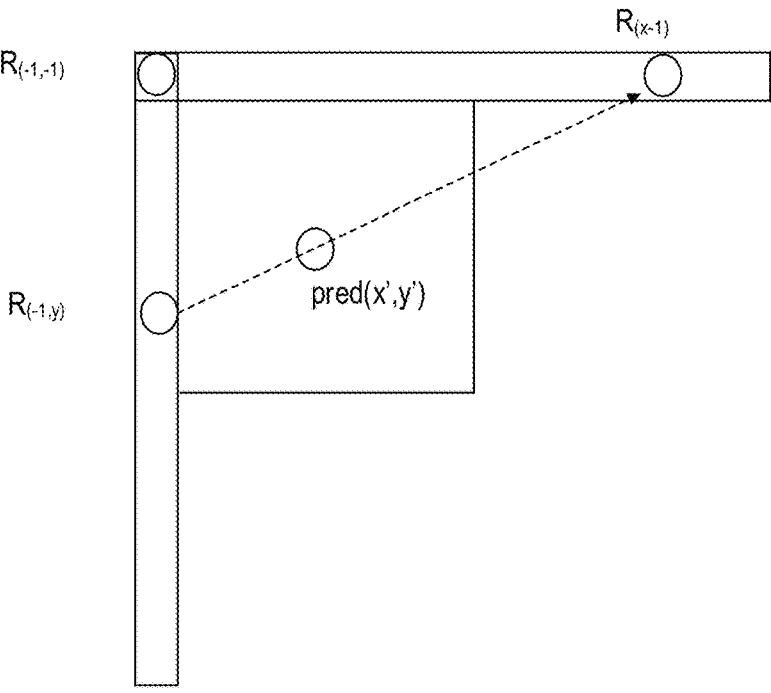
Fig. 8C
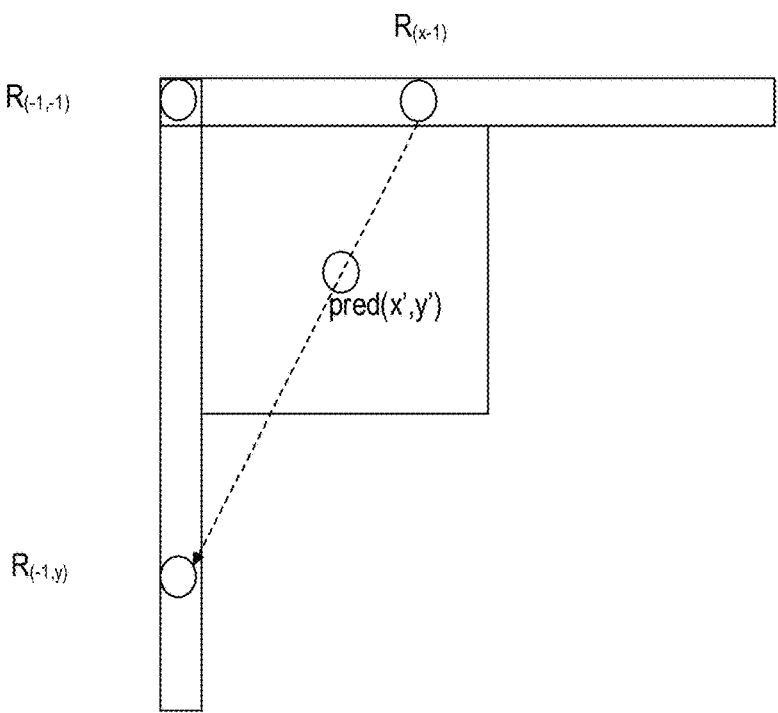
Fig. 8D

900

1000

1050

1210

1230

1250

1270

1300

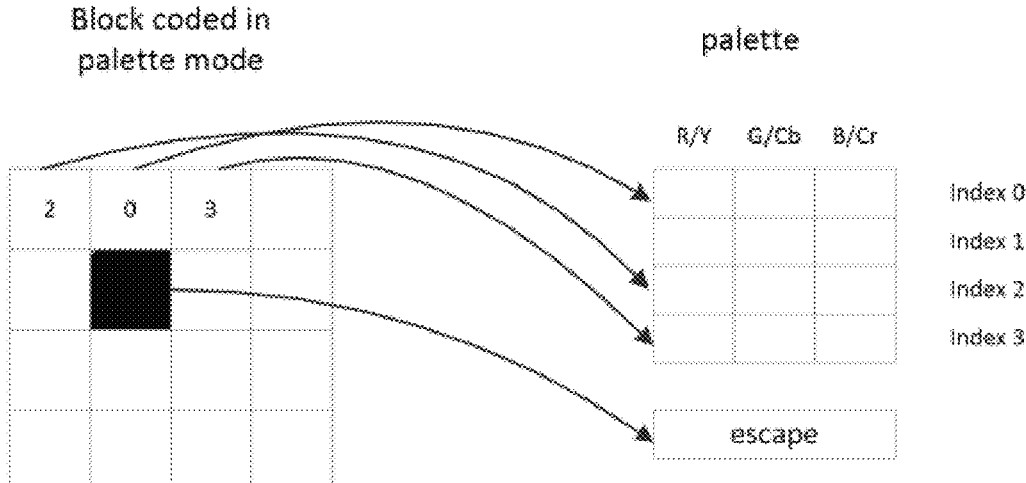
Fig. 14
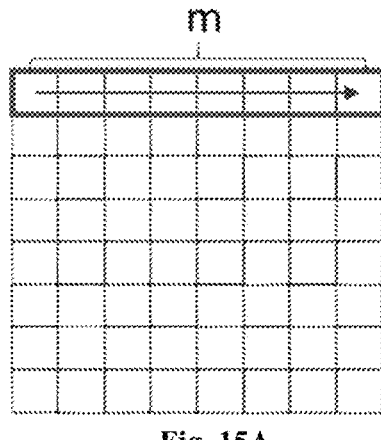
Fig. 15A
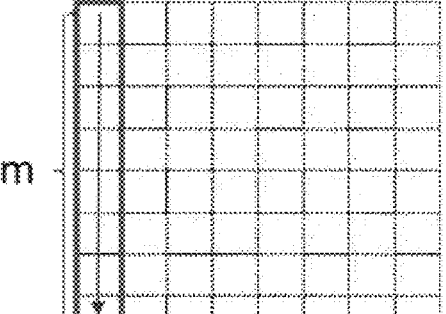
Fig. 15B

1600

1700

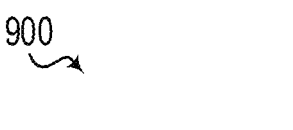
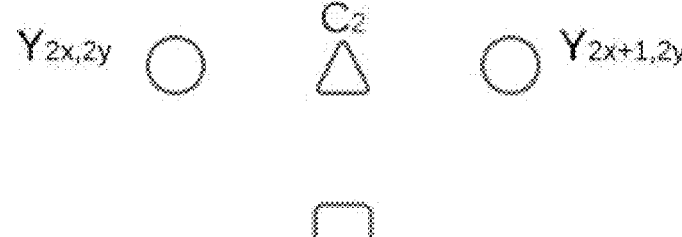
Fig. 19
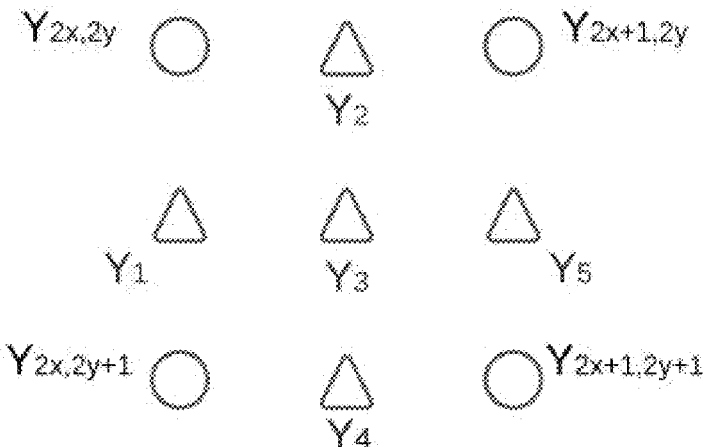
Fig. 20

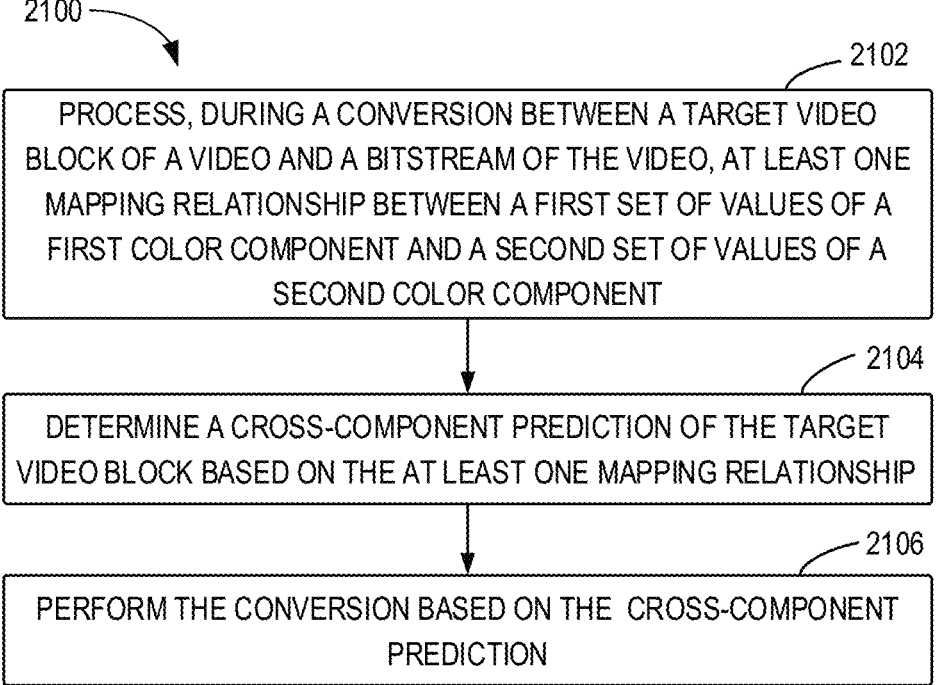

2100

PROCESS, DURING A CONVERSION BETWEEN A TARGET VIDEO BLOCK OF A VIDEO AND A BITSTREAM OF THE VIDEO, AT LEAST ONE MAPPING RELATIONSHIP BETWEEN A FIRST SET OF VALUES OF A FIRST COLOR COMPONENT AND A SECOND SET OF VALUES OF A SECOND COLOR COMPONENT
2102

DETERMINE A CROSS-COMPONENT PREDICTION OF THE TARGET VIDEO BLOCK BASED ON THE AT LEAST ONE MAPPING RELATIONSHIP
2104

PERFORM THE CONVERSION BASED ON THE CROSS-COMPONENT PREDICTION
2106

DETERMINE, DURING A CONVERSION BETWEEN A TARGET VIDEO BLOCK OF A VIDEO AND A BITSTREAM OF THE VIDEO, A MAPPING RELATIONSHIP BETWEEN A FIRST SET OF LUMA VALUES AND A SECOND SET OF CHROMA VALUES

2204

DETERMINE A CHROMA VALUE OF THE TARGET VIDEO BLOCK BASED ON THE MAPPING RELATIONSHIP

2206

PERFORM THE CONVERSION BASED ON THE CHROMA VALUE

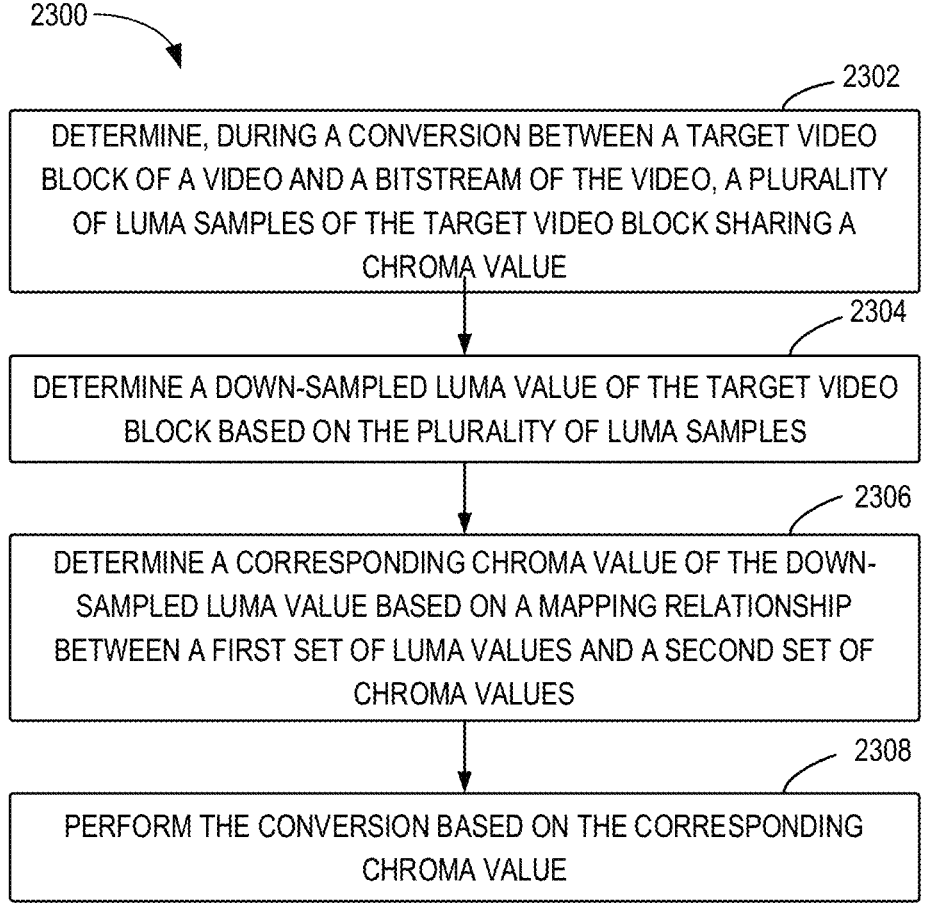

2300

2302

DETERMINE, DURING A CONVERSION BETWEEN A TARGET VIDEO BLOCK OF A VIDEO AND A BITSTREAM OF THE VIDEO, A PLURALITY OF LUMA SAMPLES OF THE TARGET VIDEO BLOCK SHARING A CHROMA VALUE

2304

DETERMINE A DOWN-SAMPLED LUMA VALUE OF THE TARGET VIDEO BLOCK BASED ON THE PLURALITY OF LUMA SAMPLES

2306

DETERMINE A CORRESPONDING CHROMA VALUE OF THE DOWN-SAMPLED LUMA VALUE BASED ON A MAPPING RELATIONSHIP BETWEEN A FIRST SET OF LUMA VALUES AND A SECOND SET OF CHROMA VALUES

2308

PERFORM THE CONVERSION BASED ON THE CORRESPONDING CHROMA VALUE

Fig. 23

METHOD, APPARATUS, AND MEDIUM FOR VIDEO PROCESSING

CROSS REFERENCE TO RELATED APPLICATION

This application is a continuation of International Application No. PCT/US2023/060139, filed on Jan. 5, 2023, which claims the benefit of U.S. Provisional Application Ser. No. 63/266,451, and filed on Jan. 5, 2022. The entire contents of these applications are hereby incorporated by reference in their entireties.

FIELD

Embodiments of the present disclosure relates generally to video coding techniques, and more particularly, to cross-component prediction.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a target video block of a video and a bitstream of the video, at least one mapping relationship between a first set of values of a first color component and a second set of values of a second color component; determining a cross-component prediction of the target video block based on the at least one mapping relationship; and performing the conversion based on the cross-component prediction. The method in accordance with the first aspect of the present disclosure determines the cross-component prediction based on a mapping relationship between values of the first and second color components, and thus the coding effectiveness and coding efficiency can be improved.

In a second aspect, another method for video processing is proposed. The method comprises: determining, during a conversion between a target video block of a video and a bitstream of the video, a mapping relationship between a first set of luma values and a second set of chroma values; determining a chroma value of the target video block based on the mapping relationship; and performing the conversion based on the chroma value. The method in accordance with the second aspect of the present disclosure determines a chroma value of the target video block based on a mapping relationship between luma values and chroma values, and thus the coding effectiveness and coding efficiency can be improved.

In a third aspect, another method for video processing is proposed. The method comprises: determining, during a conversion between a target video block of a video and a bitstream of the video, a plurality of luma samples of the target video block sharing a chroma value; determining a down-sampled luma value of the target video block based on the plurality of luma samples; determining a corresponding chroma value of the down-sampled luma value based on a mapping relationship between a first set of luma values and a second set of chroma values; and performing the conversion based on the corresponding chroma value. The method in accordance with the third aspect of the present disclosure determines a down-sampled luma value based on a plurality of luma values sharing a chroma value and determines a corresponding chroma value of the down-sampled luma value based on a mapping relationship between luma values and chroma values, and thus the coding effectiveness and coding efficiency can be improved.

In a fourth aspect, an apparatus for processing video data is proposed. The apparatus for processing video data comprises a processor and a non-transitory memory with instructions thereon. The instructions upon execution by the processor, cause the processor to perform a method in accordance with the first, second or third aspect of the present disclosure.

In a fifth aspect, a non-transitory computer-readable storage medium is proposed. The non-transitory computer-readable storage medium stores instructions that cause a processor to perform a method in accordance with the first, second or third aspect of the present disclosure.

In a sixth aspect, a non-transitory computer-readable recording medium is proposed. The non-transitory computer-readable recording medium stores a bitstream of a video which is generated by a method performed by a video processing apparatus. The method comprises: determining at least one mapping relationship between a first set of values of a first color component and a second set of values of a second color component; determining a cross-component prediction of a target video block of the video based on the at least one mapping relationship; and generating the bitstream based on the cross-component prediction.

In a seventh aspect, a method for storing a bitstream of a video is proposed. The method comprises: determining at least one mapping relationship between a first set of values of a first color component and a second set of values of a second color component; determining a cross-component prediction of a target video block of the video based on the at least one mapping relationship; generating the bitstream based on the cross-component prediction; and storing the bitstream in a non-transitory computer-readable recording medium.

In an eighth aspect, another non-transitory computer-readable recording medium is proposed. The non-transitory computer-readable recording medium stores a bitstream of a video which is generated by a method performed by a video processing apparatus. The method comprises: determining a mapping relationship between a first set of luma values and a second set of chroma values; determining a chroma value of a target video block of the video based on the mapping relationship; and generating the bitstream based on the chroma value.

In a ninth aspect, a method for storing a bitstream of a video is proposed. The method comprises: determining a mapping relationship between a first set of luma values and a second set of chroma values; determining a chroma value of a target video block of the video based on the mapping relationship; generating the bitstream based on the chroma value; and storing the bitstream in a non-transitory computer-readable recording medium.

In a tenth aspect, another non-transitory computer-readable recording medium is proposed. The non-transitory computer-readable recording medium stores a bitstream of a video which is generated by a method performed by a video processing apparatus. The method comprises: determining a plurality of luma samples of a target video block of the video sharing a chroma value; determining a down-sampled luma value of the target video block based on the plurality of luma samples; determining a corresponding chroma value of the down-sampled luma value based on a mapping relationship between a first set of luma values and a second set of chroma values; and generating the bitstream based on the corresponding chroma value.

In an eleventh aspect, a method for storing a bitstream of a video is proposed. The method comprises: determining a plurality of luma samples of a target video block of the video sharing a chroma value; determining a down-sampled luma value of the target video block based on the plurality of luma samples; determining a corresponding chroma value of the down-sampled luma value based on a mapping relationship between a first set of luma values and a second set of chroma values; generating the bitstream based on the corresponding chroma value; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIGS. 8A-8D illustrate definition of samples used by PDPC applied to diagonal and adjacent angular intra modes;

FIG. 14 illustrates example of a block coded in palette mode;

FIG. 15A illustrates subblock-based index map scanning for palette for horizontal scanning;

FIG. 15B illustrates subblock-based index map scanning for palette for vertical scanning;

FIG. 19 illustrates an illustration of luma down-sampling;

FIG. 20 illustrates luma down-sampling positions;

FIG. 21 illustrates a flowchart of a method for video processing in accordance with some embodiments of the present disclosure;

FIG. 23 illustrates another flowchart of a method for video processing in accordance with some embodiments of the present disclosure.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
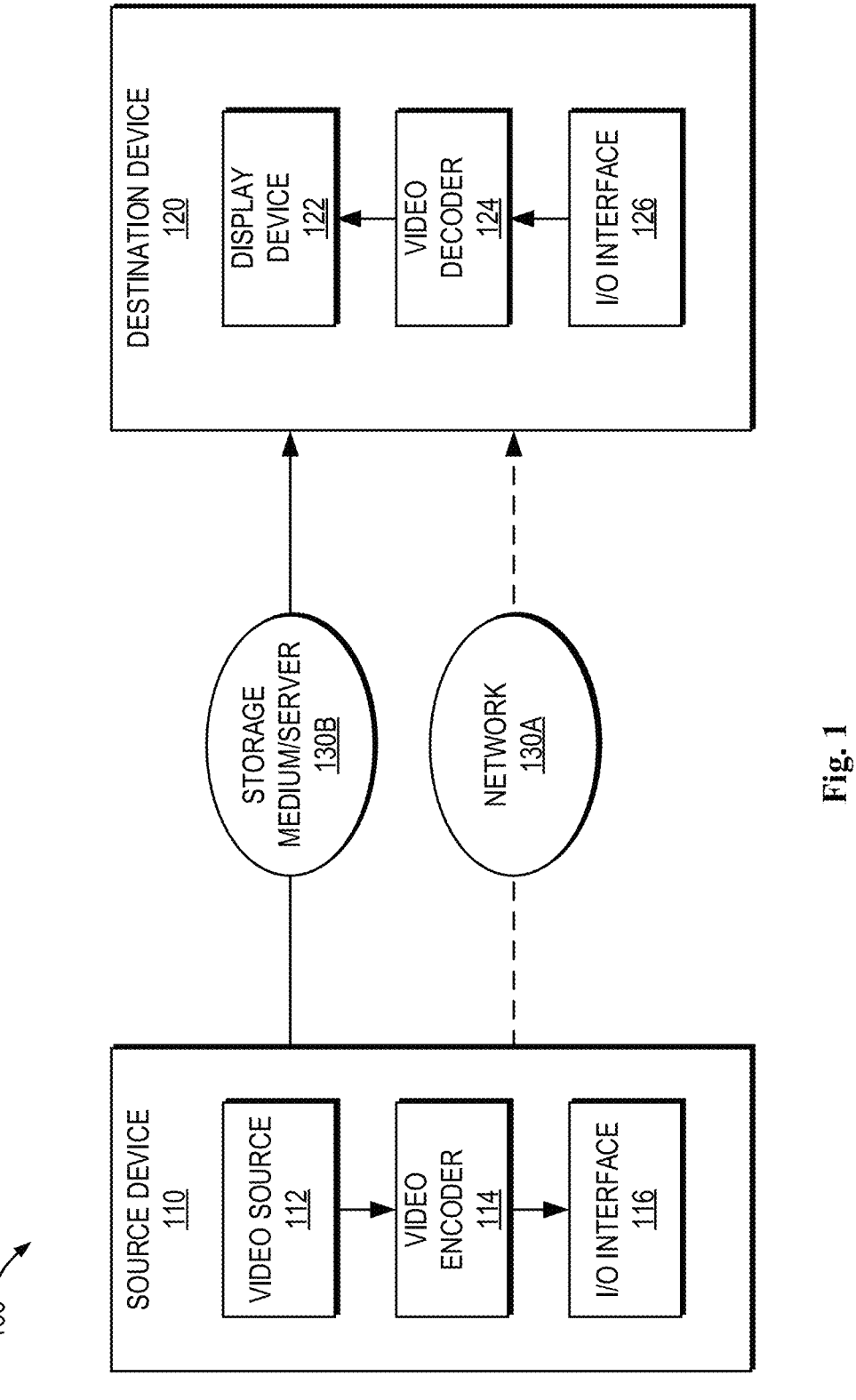
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
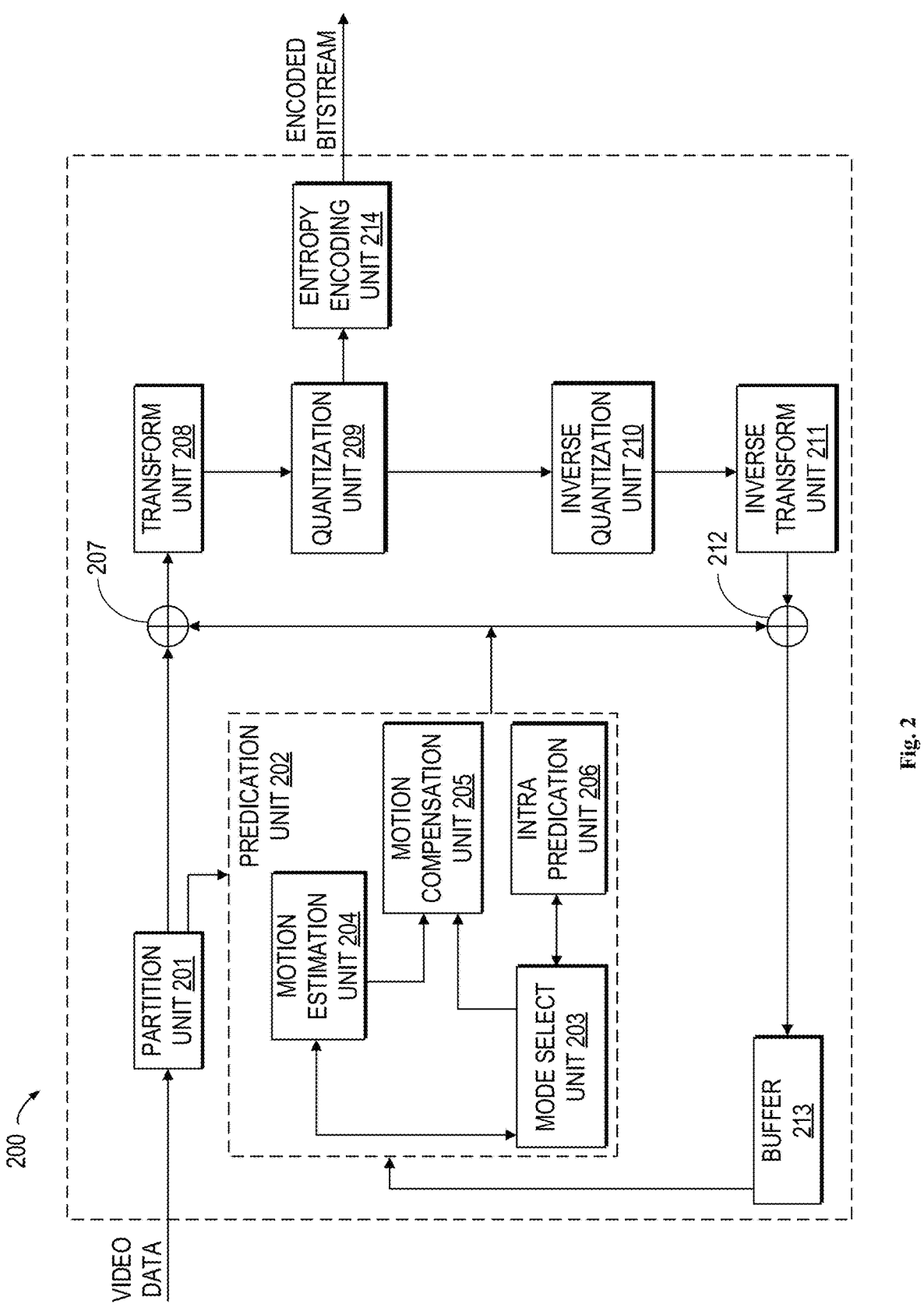
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
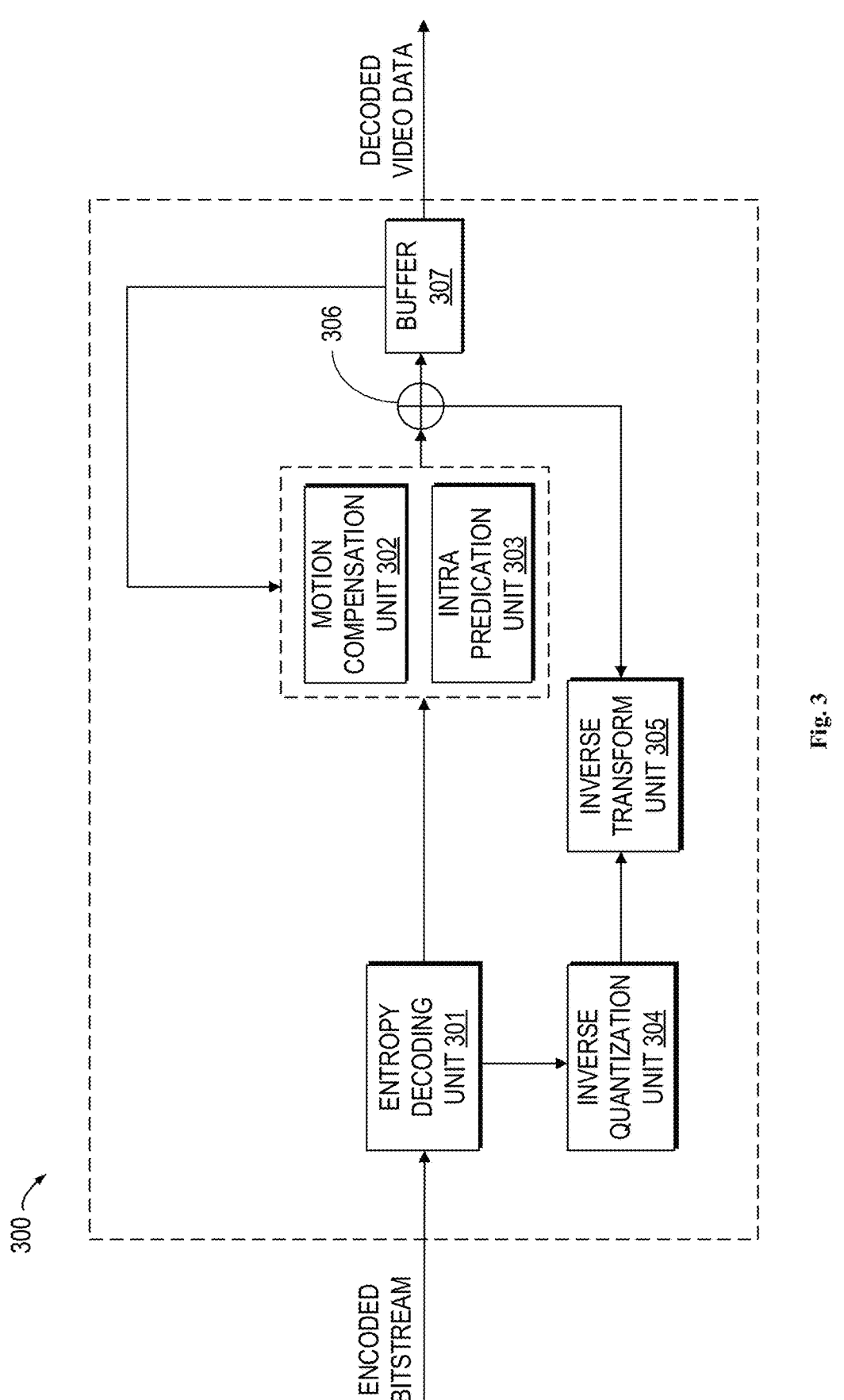
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1 Summary

This disclosure is related to video coding technologies. Specifically, it is related to intra prediction in video coding with special emphasis on screen content sequences. The ideas may be applied individually or in various combination, to any image/video coding standard or non-standard image/video codec, e.g., next-generation image/video coding standard.

2 Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting. ITU-T VCEG (Q6/16) and ISO/IEC MPEG (JTC 1/SC 29/WG 11) are studying the potential need for standardization of future video coding technology with a compression capability that significantly exceeds that of the current VVC standard. Such future standardization action could either take the form of additional extension(s) of VVC or an entirely new standard. The groups are working together to evaluate compression technology designs proposed by their experts in this area. The first Exploration Experiments (EE) were established in JVET meeting during 6-15 Jan. 2021 under the title Enhanced Compression Model (ECM).

2.1 Dual-Tree in VVC

In VVC, luma and chroma components can employ different block partitioning structures. To elaborate, a block partitioning structure shared by two chroma components is signaled independent of the one used for luma component in the CTU. This coding structure is referred as dual-tree structure. The separation is either from the root of a CTU (global dual-tree), which is enabled only for intra-coded slices, or from certain small block sizes (local dual-tree) when global dual-tree does not apply. The traditionally coding structure that includes a luma block and two corresponding chroma blocks is referred as joint-tree coding structure.

2.2 Intra Prediction in VVC

2.2.1 Intra Mode Coding with 67 Intra Prediction Modes

Figure 4:
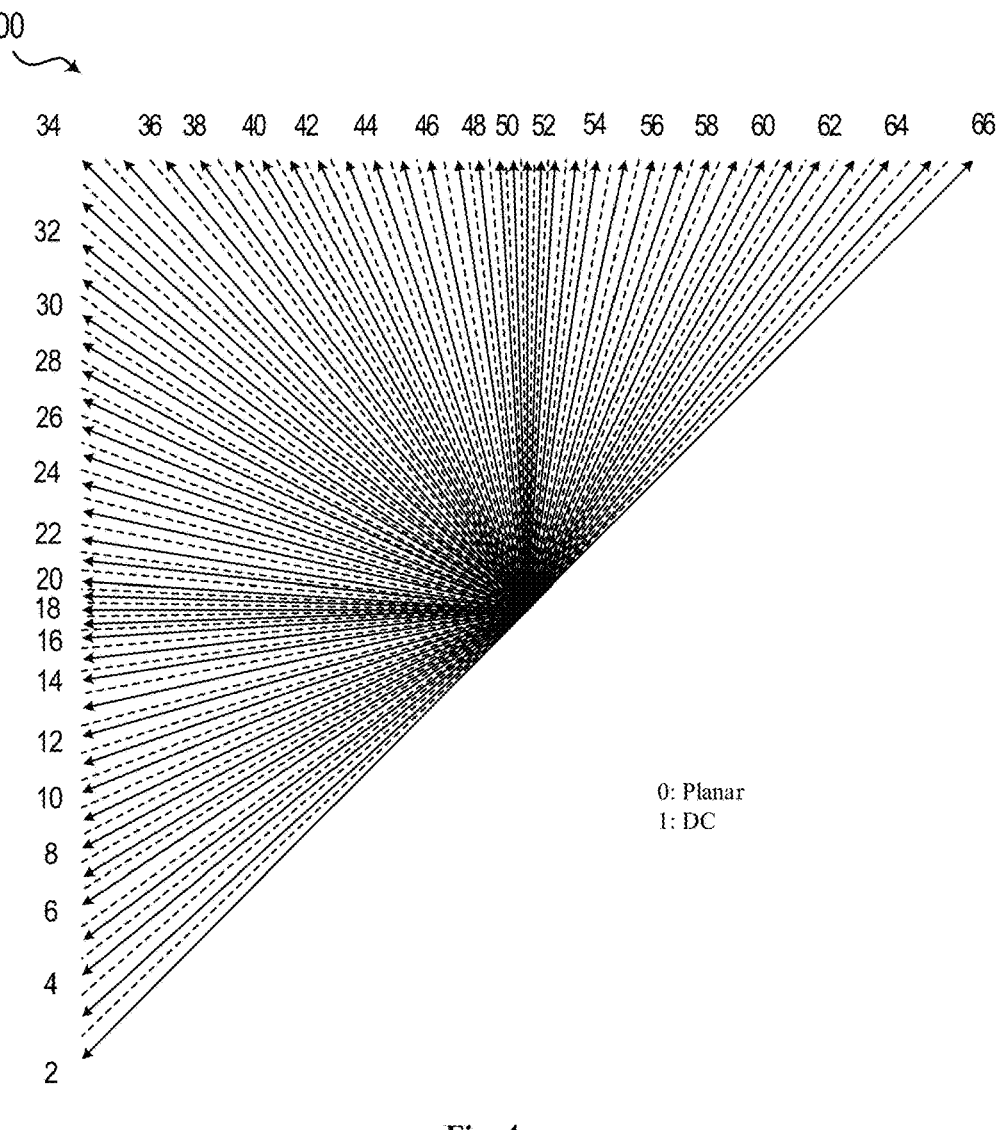
FIG. 4 illustrates 67 intra prediction modes.

To capture the arbitrary edge directions presented in natural video, the number of directional intra modes in VVC is extended from 33, as used in HEVC, to 65. FIG. 4 illustrates an example diagram 400 showing 67 intra prediction modes. The new directional modes not in HEVC are depicted as dotted arrows in FIG. 4, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks. Wide angle intra prediction is described in 3.3.1.2.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.2.1.1 Intra Mode Coding

To keep the complexity of the most probable mode (MPM) list generation low, an intra mode coding method with 6 MPMs is used by considering two available neighboring intra modes.

The following three aspects are considered to construct the MPM list:

Default intra modes,

Neighbouring intra modes,

Derived intra modes.

A unified 6-MPM list is used for intra blocks irrespective of whether MRL and ISP coding tools are applied or not. The MPM list is constructed based on intra modes of the left and above neighboring block. Suppose the mode of the left is denoted as Left and the mode of the above block is denoted as Above, the unified MPM list is constructed as follows:

When a neighboring block is not available, its intra mode is set to Planar by default.

If both modes Left and Above are non-angular modes: MPM list→{Planar, DC, V, H, V−4, V+4}.

If one of modes Left and Above is angular mode, and the other is non-angular:

Set a mode Max as the larger mode in Left and Above.

MPM list→{Planar, Max, Max−1, Max+1, Max−2, Max+2}.

If Left and Above are both angular and they are different:

Set a mode Max as the larger mode in Left and Above.

Set a mode Min as the smaller mode in Left and Above.

If Max-Min is equal to 1:

MPM list→{Planar, Left, Above, Min−1, Max+1, Min−2}.

Otherwise, if Max-Min is greater than or equal to 62:

MPM list→{Planar, Left, Above, Min+1, Max−1, Min+2}.

Otherwise, if Max-Min is equal to 2:

MPM list→{Planar, Left, Above, Min+1, Min−1, Max+1}.

Otherwise:

MPM list→{Planar, Left, Above, Min−1, −Min+1, Max−1}.

If Left and Above are both angular and they are the same:

MPM list→{Planar, Left, Left−1, Left+1, Left−2, Left+2}.

Besides, the first bin of the mpm index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

2.2.1.2 Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 5A:
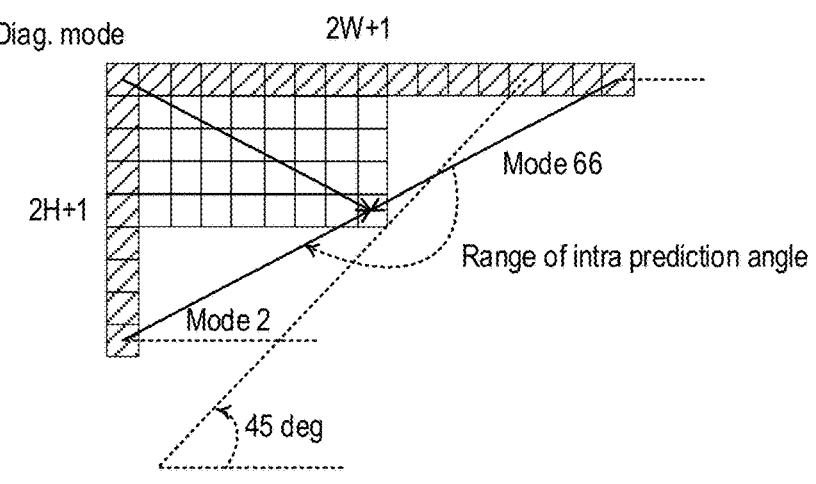
FIG. 5A and FIG. 5B illustrate reference samples for wide-angular intra prediction.
Figure 5B:
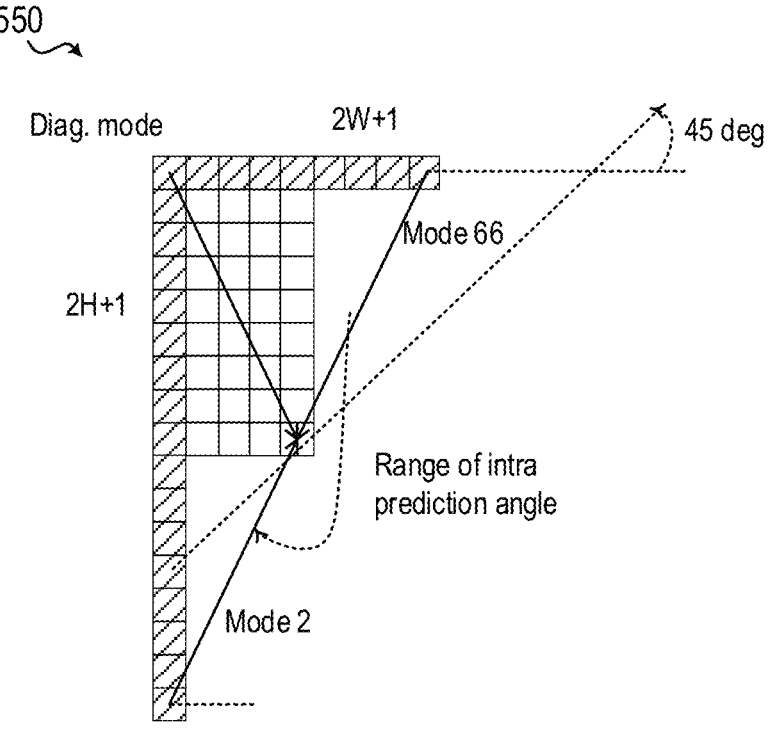

FIG. 5A and FIG. 5B illustrate example diagrams 500 and 550 showing reference samples for wide-angular intra prediction. To support these prediction directions, the top reference with length 2W+1, and the left reference with length 2H+1, are defined as shown in FIGS. 5A and 5B.

The number of replaced modes in wide-angular direction mode depends on the aspect ratio of a block. The replaced intra prediction modes are illustrated in Table 1.

TABLE 1

| Intra prediction modes replaced by wide-angular modes | |
| --- | --- |
| Aspect ratio | Replaced intra prediction modes |
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, 8, 9 |
| W/H == 1 | None |
| W/H == ½ | Modes 59, 60, 61, 62, 63, 64, 65, 66 |
| W/H == ¼ | Mode 57, 58, 59, 60, 61, 62, 63, 64, 65, 66 |
| W/H == ⅛ | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Figure 6:
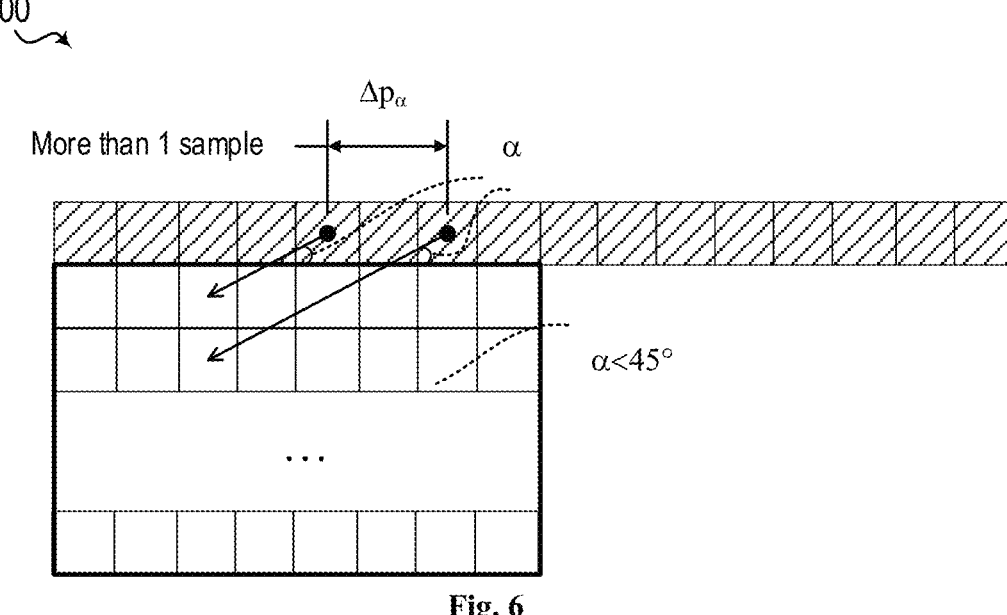
FIG. 6 illustrates problem of discontinuity in case of directions beyond 45°.

FIG. 6 illustrates an example diagram 600 showing a problem of discontinuity in case of directions beyond 45°. As shown in FIG. 6, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135 degree and above 45 degree, luma intra prediction modes ranging from 2 to 5 are mapped to 2. Therefore chroma DM derivation table for 4:2:2 chroma format is updated by replacing some values of the entries of the mapping table to convert prediction angle more precisely for chroma blocks.

2.2.1.3 4-Tap Interpolation Filter and Reference Sample Smoothing

Four-tap intra interpolation filters are utilized to improve the directional intra prediction accuracy. In HEVC, a two-tap linear interpolation filter has been used to generate the intra prediction block in the directional prediction modes (i.e., excluding Planar and DC predictors). In VVC, the two sets of 4-tap IFs replace lower precision linear interpolation as in HEVC, where one is a DCT-based interpolation filter (DCTIF) and the other one is a 4-tap smoothing interpolation filter (SIF). The DCTIF is constructed in the same way as the one used for chroma component motion compensation in both HEVC and VVC. The SIF is obtained by convolving the 2-tap linear interpolation filter with [1 2 1]/4 filter.

Depending on the intra prediction mode, the following reference samples processing is performed:

The directional intra-prediction mode is classified into one of the following groups:

Group A: vertical or horizontal modes (HOR_IDX, VER_IDX),

Group B: directional modes that represent non-fractional angles (−14, −12, −10, −6, 2, 34, 66, 72, 76, 78, 80,) and Planar mode, Group C: remaining directional modes;

If the directional intra-prediction mode is classified as belonging to group A, then then no filters are applied to reference samples to generate predicted samples;

Otherwise, if a mode falls into group B and the mode is a directional mode, and all of following conditions are true, then a [1, 2, 1] reference sample filter may be applied (depending on the MDIS condition) to reference samples to further copy these filtered values into an intra predictor according to the selected direction, but no interpolation filters are applied:

refIdx is equal to 0 (no MRL),

TU size is greater than 32,

Luma,

No ISP block.

Otherwise, if a mode is classified as belonging to group C, MRL index is equal to 0, and the current block is not ISP block, then only an intra reference sample interpolation filter is applied to reference samples to generate a predicted sample that falls into a fractional or integer position between reference samples according to a selected direction (no reference sample filtering is performed). The interpolation filter type is determined as follows:

Set minDistVerHor equal to Min(Abs(predModeIntra− 50), Abs(predModeIntra−18)),

Set nTbS equal to (Log 2 (W)+ Log 2 (H))>>1,

Set intraHorVerDistThres[nTbS] as specified below.

| | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 24 | 14 | 2 | 0 | 0 | 0 |

If minDistVerHor is greater than intraHorVerDistThres [nTbS], SIF is used for the interpolation.

Otherwise, DCTIF is used for the interpolation.

2.2.2 Cross-Component Linear Model Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i, j) = \alpha \cdot rec'_L(i, j) + \beta \qquad (3\text{-}1)$$

where $pred_C(i,j)$ represents the predicted chroma samples in a CU and $rec_L(i,j)$ represents the downsampled reconstructed luma samples of the same CU.

The CCLM parameters (a and B) are derived with at most four neighbouring chroma samples and their corresponding down-sampled luma samples. Suppose the current chroma block dimensions are W×H, then W" and H' are set as W'=W, H'=H when LM mode is applied;

W'=W+H when LM-A mode is applied;

H'=H+W when LM-L mode is applied;

The above neighbouring positions are denoted as S[0, −1] . . . S[W'−1, −1] and the left neighbouring positions are denoted as S[−1, 0] . . . S[−1, H'−1]. Then the four samples are selected as:

S[W/4, −1], S[3*W'/4, −1], S[−1, H'/4], S[−1, 3*H'/4] when LM mode is applied and both above and left neighbouring samples are available;

S[W/8, −1], S[3*W'/8, −1], S[5*W'/8, −1], S[7*W'/8, −1] when LM-A mode is applied or only the above neighbouring samples are available;

S[−1, H'/8], S[−1, 3*H'/8], S[−1, 5*H'/8], S[−1, 7*H'/8] when LM-L mode is applied or only the left neighbouring samples are available.

The four neighbouring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$X_a = \left(x^0_A + x^1_A + 1\right) >> 1; \; X_b = \left(x^0_B + x^1_B + 1\right) >> 1; \qquad (3\text{-}2)$$

$$Y_a = \left(y^0_A + y^1_A + 1\right) >> 1; \; Y_b = \left(y^0_B + y^1_B + 1\right) >> 1$$

Finally, the linear model parameters a and B are obtained according to the following equations.

$$\alpha = \frac{Y_a - Y_b}{X_a - X_b} \qquad (3\text{-}3)$$

$$\beta = Y_b - \alpha \cdot X_b \qquad (3\text{-}4)$$

Figure 7A:
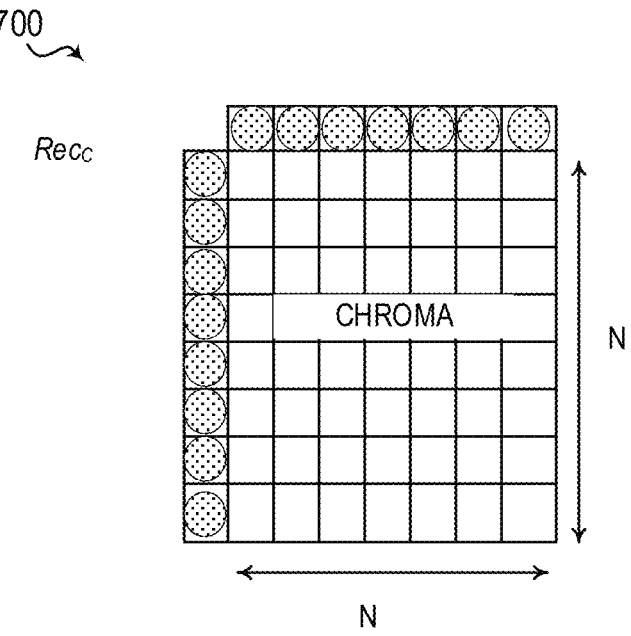
FIG. 7A and FIG. 7B illustrate locations of the samples used for the derivation of a and B.
Figure 7B:
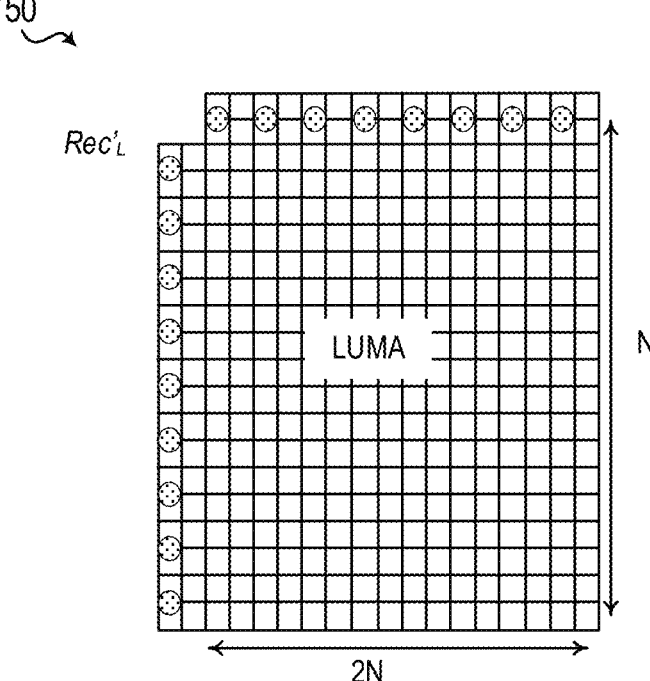

FIG. 7A and FIG. 7B illustrate example diagrams 700 and 750 showing locations of the samples used for the derivation of a and B. FIG. 7A and FIG. 7B show an example of the location of the left and above samples and the sample of the current block involved in the CCLM mode.

The division operation to calculate parameter a is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significand as follows:

$$DivTable\,[\,] = \{0, 7, 6, 5, 5, 4, 4, 3, 3, 2, 2, 1, 1, 1, 1, 0\}. \qquad (3\text{-}5)$$

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_T mode, only the above template are used to calculate the linear model coefficients. To get more samples, the above template are extended to (W+H) samples. In LM_L mode, only left template are used to calculate the linear model coefficients. To get more samples, the left template are extended to (H+W) samples.

In LM_LT mode, left and above templates are used to calculate the linear model coefficients. To match the chroma sample locations for 4:2:0 video sequences, two types of downsampling filter are applied to luma samples to achieve 2 to 1 downsampling ratio in both horizontal and vertical directions. The selection of downsampling filter is specified by a SPS level flag. The two downsampling filters are as follows, which are corresponding to "type-0" and "type-2" content, respectively.

$$Rec'_L(i, j) = \begin{bmatrix} rec_L(2i-1, 2j-1) + 2 \cdot rec_L(2i-1, 2j-1) + \\ rec_L(2i+1, 2j-1) + rec_L(2i-1, 2j) + \\ 2 \cdot rec_L(2i, 2j) + rec_L(2i+1, 2j) + 4 \end{bmatrix} >> 3 \quad (3\text{-}6)$$

$$rec'_L(i, j) = \begin{bmatrix} rec_L(2i, 2j-1) + rec_L(2i-1, 2j) + 4 \cdot \\ rec_L(2i, 2j) + rec_L(2i+1, 2j) + \\ rec_L(2i, 2j+1) + 4 \end{bmatrix} >> 3 \quad (3\text{-}7)$$

Note that only one luma line (general line buffer in intra prediction) is used to make the downsampled luma samples when the upper reference line is at the CTU boundary.

This parameter computation is performed as part of the decoding process, and is not just as an encoder search operation. As a result, no syntax is used to convey the a and B values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 2. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 2

| Derivation of chroma prediction mode from luma mode when cclm_is enabled | | | | | |
|---|---|---|---|---|---|
| Chroma | Corresponding luma intra prediction mode | | | | |
| prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |

TABLE 2-continued

| Derivation of chroma prediction mode from luma mode when cclm_is enabled | | | | | |
|---|---|---|---|---|---|
| Chroma | Corresponding luma intra prediction mode | | | | |
| prediction mode | 0 | 50 | 18 | 1 | X (0 <= X <= 66) |
| 6 | 82 | 82 | 82 | 82 | 82 |
| 7 | 83 | 83 | 83 | 83 | 83 |

A single binarization table is used regardless of the value of sps_cclm_enabled_flag as shown in Table 3.

TABLE 3

| Unified binarization table for chroma prediction mode | |
|---|---|
| Value of intra_chroma_pred_mode | Bin string |
| 4 | 00 |
| 0 | 0100 |
| 1 | 0101 |
| 2 | 0110 |
| 3 | 0111 |
| 5 | 10 |
| 6 | 110 |
| 7 | 111 |

In Table 3, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 3 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM.

If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

2.2.3 Position Dependent Intra Prediction Combination

In VVC, the results of intra prediction of DC, planar and several angular modes are further modified by a position dependent intra prediction combination (PDPC) method. PDPC is an intra prediction method which invokes a combination of the boundary reference samples and HEVC style intra prediction with filtered boundary reference samples. PDPC is applied to the following intra modes without signalling: planar, DC, intra angles less than or equal to horizontal, and intra angles greater than or equal to vertical and less than or equal to 80. If the current block is Bdpcm mode or MRL index is larger than 0, PDPC is not applied.

The prediction sample pred(x',y') is predicted using an intra prediction mode (DC, planar, angular) and a linear combination of reference samples according to the Equation 3-8 as follows:

$$
\begin{aligned}
pred(x', y') = & \quad\quad\quad\quad\quad\quad\quad\quad\quad (3\text{-}8) \\
& Clip(0, (1 << BitDepth) - 1, (wL \times R_{-1,y'} + wT \times R_{x',-1} + \\
& (64 - wL - wT) \times pred(x', y') + 32) >> 6).
\end{aligned}
$$

where $R_{x,-1}$, $R_{-1,y}$ represent the reference samples located at the top and left boundaries of current sample (x, y), respectively.

If PDPC is applied to DC, planar, horizontal, and vertical intra modes, additional boundary filters are not needed, as required in the case of HEVC DC mode boundary filter or horizontal/vertical mode edge filters. PDPC process for DC and Planar modes is identical. For angular modes, if the current angular mode is HOR_IDX or VER_IDX, left or top reference samples is not used, respectively. The PDPC weights and scale factors are dependent on prediction modes and the block sizes. PDPC is applied to the block with both width and height greater than or equal to 4.

FIGS. 8A-8D illustrate definition of samples used by PDPC applied to diagonal and adjacent angular intra modes. FIG. 8A illustrates an example diagram 800 showing a definition of samples used by PDPC applied to diagonal top-right mode. FIG. 8B illustrates an example diagram 820 showing a definition of samples used by PDPC applied to diagonal bottom-left mode. FIG. 8C illustrates an example diagram 840 showing a definition of samples used by PDPC applied to adjacent diagonal top-right. FIG. 8D illustrates an example diagram 860 showing a definition of samples used by PDPC applied to adjacent diagonal bottom-left mode. FIGS. 8A-8D illustrate the definition of reference samples ($R_{x,-1}$ and $R_{-1,y}$) for PDPC applied over various prediction modes. The prediction sample pred(x', y') is located at (x', y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other angular mode, the reference samples $R_{x,-1}$ and $R_{-1,y}$ could be located in fractional sample position. In this case, the sample value of the nearest integer sample location is used.

2.2.4 Multiple Reference Line (MRL) Intra Prediction

Figure 9:
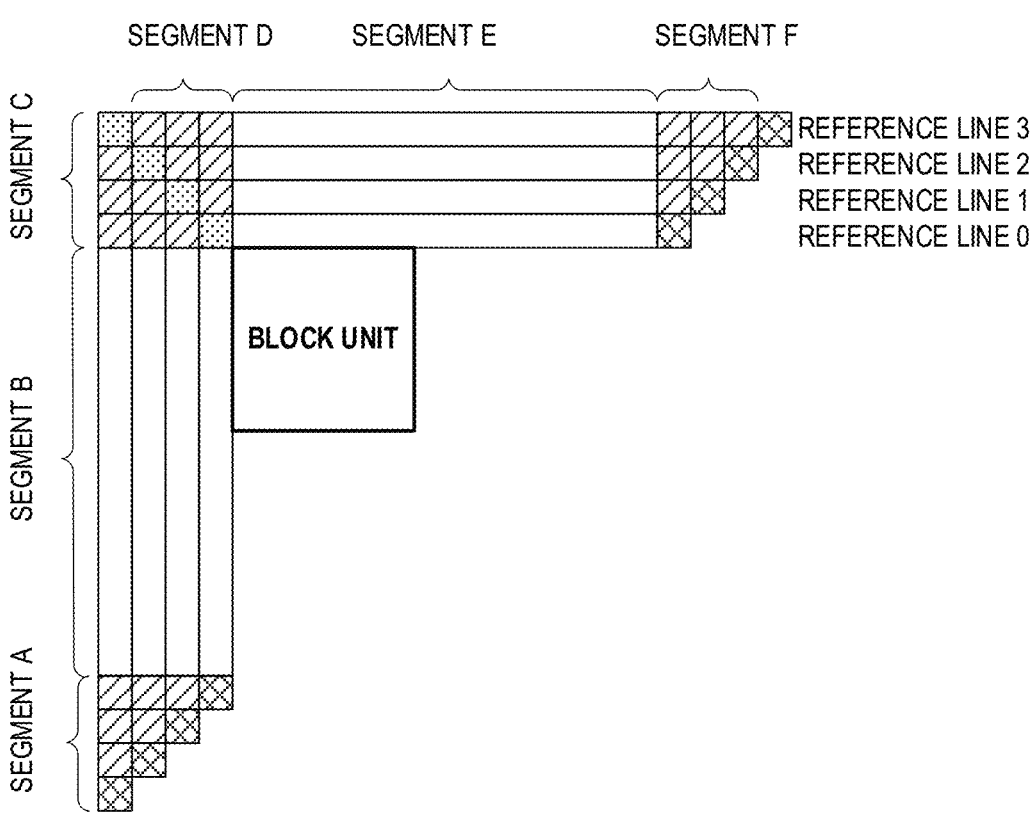
FIG. 9 illustrates an example of four reference lines neighboring to a prediction block.

FIG. 9 illustrates an example diagram 900 of four reference lines neighboring to a prediction block. Multiple reference line (MRL) intra prediction uses more reference lines for intra prediction. In FIG. 9, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signalled and used to generate intra predictor. For reference line idx, which is greater than 0, only include additional reference line modes in MPM list and only signal mpm index without remaining mode. The reference line index is signalled before intra prediction modes, and Planar mode is excluded from intra prediction modes in case a nonzero reference line index is signalled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices is aligned with that of reference line index 0. MRL requires the storage of 3 neighboring luma reference lines with a CTU to generate predictions. The Cross-Component Linear Model (CCLM) tool also requires 3 neighboring luma reference lines for its downsampling filters. The definition of MRL to use the same 3 lines is aligned as CCLM to reduce the storage requirements for decoders.

2.2.5 Intra Sub-Partitions (ISP)

Figure 10A:
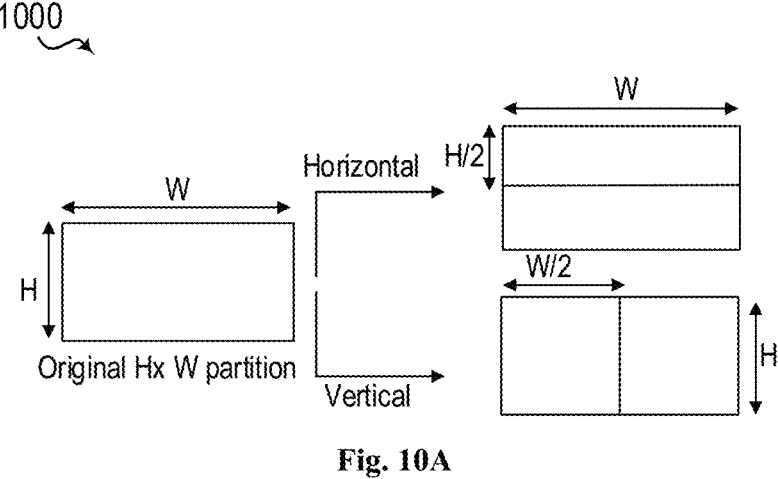
FIG. 10A and FIG. 10B illustrate examples of sub-partition depending on the block size.
Figure 10B:
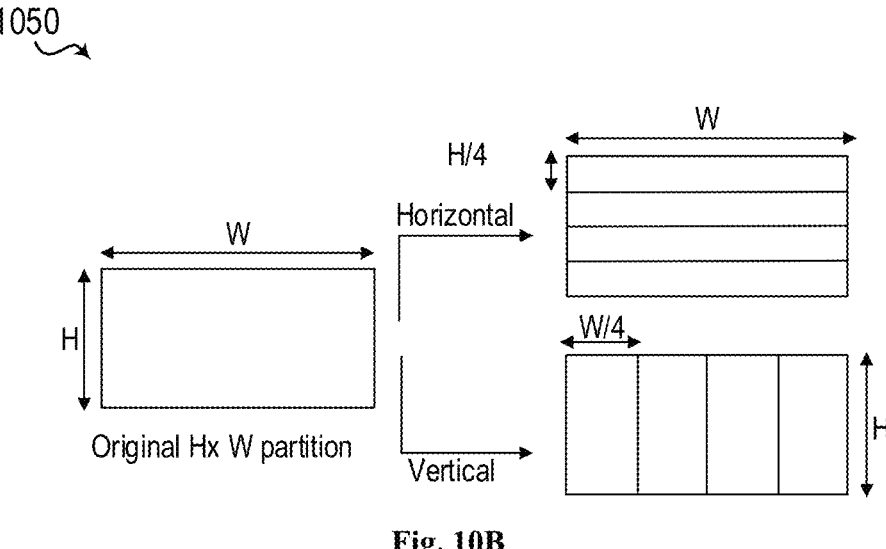

The intra sub-partitions (ISP) divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. It has been noted that the M×128 (with M≤64) and 128×N (with N≤64) ISP blocks could generate a potential issue with the 64×64 VDPU. For example, an M×128 CU in the single tree case has an M×128 luma TB and two corresponding $$
\frac{M}{2} \times 64
$$

chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 128×N CU using ISP. Hence, these two cases are an issue for the 64×64 decoder pipeline. For this reason, the CU sizes that can use ISP is restricted to a maximum of 64×64. FIG. 10A and FIG. 10B illustrate examples of sub-partition depending on the block size. FIG. 10A shows an example diagram showing examples of sub-partitions for 4×8 and 8×4 CUs. FIG. 10B shows an example diagram showing examples of sub-partitions for CUs other than 4×8, 8×4 and 4×4. FIG. 10A and FIG. 10B show examples of the two possibilities. All sub-partitions fulfill the condition of having at least 16 samples.

In ISP, the dependence of 1×N/2×N subblock prediction on the reconstructed values of previously decoded 1×N/2×N subblocks of the coding block is not allowed so that the minimum width of prediction for subblocks becomes four samples. For example, an 8×N (N>4) coding block that is coded using ISP with vertical split is split into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. Thus, there is no delay added in processing these smaller blocks than processing 4×4 regular-coded intra blocks.

TABLE 4

| Entropy coding coefficient group size | |
| --- | --- |
| Block Size | Coefficient group Size |
| $1 \times N, N \geq 16$ | $1 \times 16$ |
| $N \times 1, N \geq 16$ | $16 \times 1$ |
| $2 \times N, N \geq 8$ | $2 \times 8$ |
| $N \times 2, N \geq 8$ | $8 \times 2$ |
| All other possible $M \times N$ cases | $4 \times 4$ |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode. The followings are summary of interaction of ISP with other coding tools.

Multiple Reference Line (MRL): if a block has an MRL index other than 0, then the ISP coding mode will be inferred to be 0 and therefore ISP mode information will not be sent to the decoder.

Entropy coding coefficient group size: the sizes of the entropy coding subblocks have been modified so that they have 16 samples in all possible cases, as shown in Table 4. Note that the new sizes only affect blocks produced by ISP in which one of the dimensions is less than 4 samples. In all other cases coefficient groups keep the 4×4 dimensions.

CBF coding: it is assumed to have at least one of the sub-partitions has a non-zero CBF. Hence, if n is the number of sub-partitions and the first n−1 sub-partitions have produced a zero CBF, then the CBF of the n-th sub-partition is inferred to be 1.

Transform size restriction: all ISP transforms with a length larger than 16 points uses the DCT-II.

MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signalling is required. For example, let $t_H$ and $t_V$ be the horizontal and the vertical transforms selected respectively for the w×h sub-partition, where w is the width and h is the height. Then the transform is selected according to the following rules:

If w=1 or h=1, then there is no horizontal or vertical transform respectively.

If w≥4 and w≤16, $t_H$=DST-VII, otherwise, $t_H$=DCT-II.

If h≥4 and h≤16, $t_V$=DST-VII, otherwise, $t_V$=DCT-II.

In ISP mode, all 67 intra modes are allowed. PDPC is also applied if corresponding width and height is at least 4 samples long. In addition, the reference sample filtering process (reference smoothing) and the condition for intra interpolation filter selection doesn't exist anymore, and Cubic (DCT-IF) filter is always applied for fractional position interpolation in ISP mode.

2.2.6 Matrix Weighted Intra Prediction (MIP)

Figure 11:
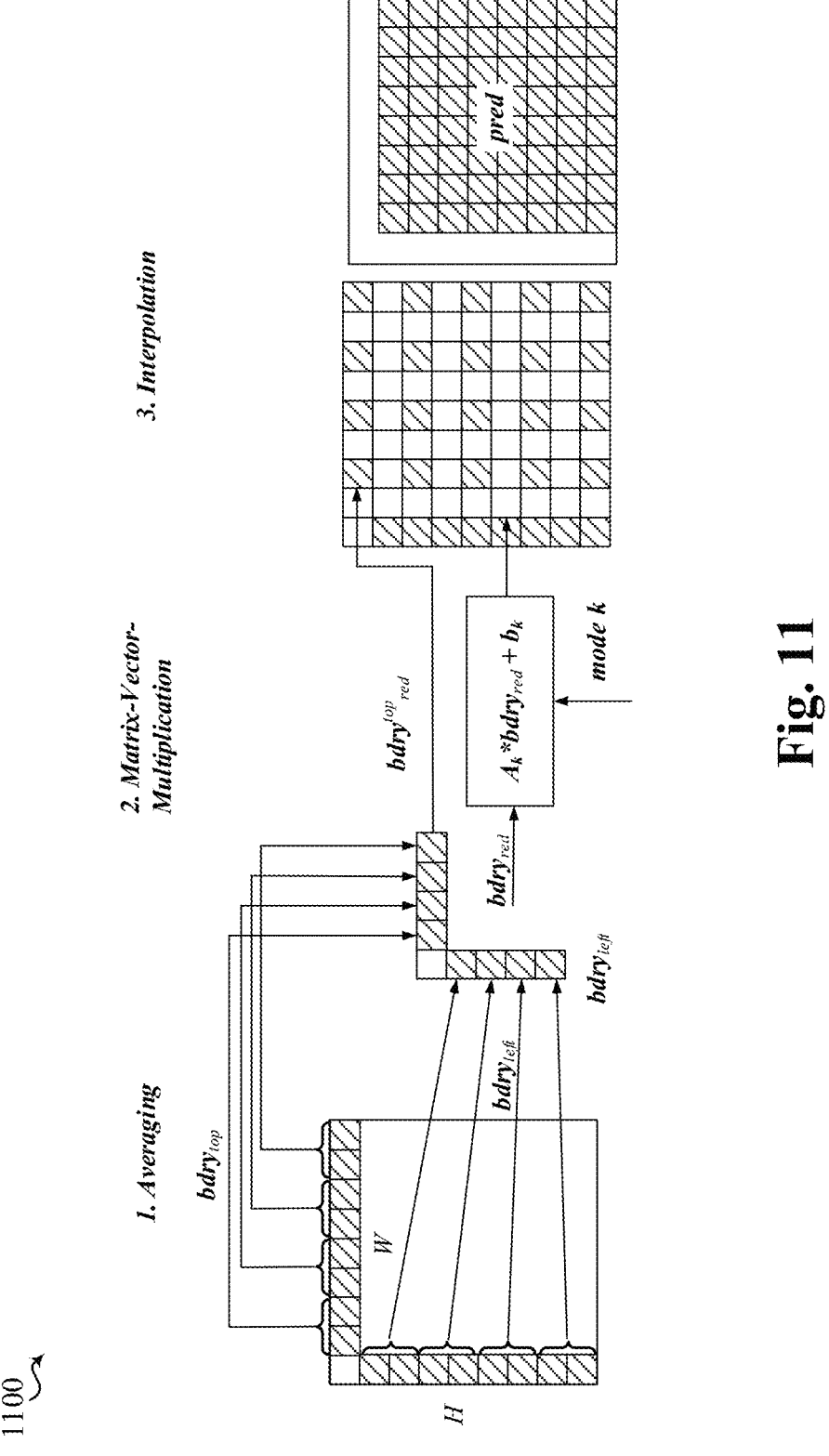
FIG. 11 illustrates an example matrix weighted intra prediction process.
Figures 12A, 12B, 12C, 12D:
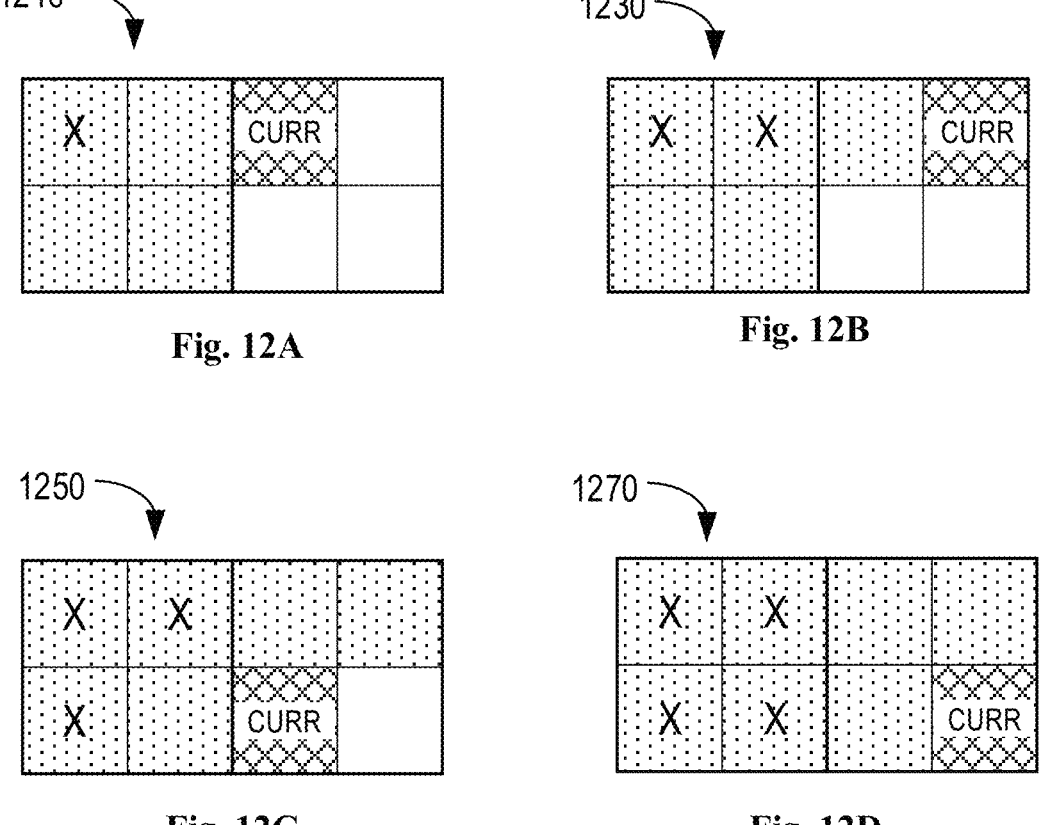
FIGS. 12A-12D illustrate current CTU processing order and its available reference samples in current and left CTU.

Matrix weighted intra prediction (MIP) method is a newly added intra prediction technique into VVC. For predicting the samples of a rectangular block of width W and height H, matrix weighted intra prediction (MIP) takes one line of H reconstructed neighbouring boundary samples left of the block and one line of W reconstructed neighbouring boundary samples above the block as input. If the reconstructed samples are unavailable, they are generated as it is done in the conventional intra prediction. FIG. 11 illustrates an example diagram 1100 showing an example matrix weighted intra prediction process. The generation of the prediction signal is based on the following three steps, which are averaging, matrix vector multiplication and linear interpolation as shown in FIG. 11.

2.1.6.1 Averaging Neighboring Samples

Among the boundary samples, four samples or eight samples are selected by averaging based on block size and shape. Specifically, the input boundaries $bdry^{top}$ and $bdry^{left}$ are reduced to smaller boundaries $$bdry_{red}^{top} \text{ and } bdry_{red}^{left}$$

by averaging neighboring boundary samples according to predefined rule depends on block size. Then, the two reduced boundaries $$bdry_{red}^{top} \text{ and } bdry_{red}^{left}$$

are concatenated to a reduced boundary vector $bdry_{red}$ which is thus of size four for blocks of shape 4×4 and of size eight for blocks of all other shapes. If mode refers to the MIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6 \end{cases} \quad (3\text{-}9)$$

2.1.6.2 Matrix Multiplication

A matrix vector multiplication, followed by addition of an offset, is carried out with the averaged samples as an input. The result is a reduced prediction signal on a subsampled set of samples in the original block. Out of the reduced input vector $bdry_{red}$ a reduced prediction signal $pred_{red}$, which is a signal on the downsampled block of width $W_{red}$ and height $H_{red}$ is generated. Here, $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases} \quad (3\text{-}10)$$

$$H_{red} = \begin{cases} 4 & \text{for } \max(W, H) \leq 8 \\ \min(H, 8) & \text{for } \max(W, H) > 8 \end{cases} \quad (3\text{-}11)$$

The reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$. The matrix A and the offset vector b are taken from one of the sets $S_0$, $S_1$, $S_2$. One defines an index idx=idx (W, H) as follows:

$$idx(W, H) = \begin{cases} 0 & \text{for } W = H = 4 \\ 1 & \text{for max } (W, H) = 8 \cdot \times \\ 2 & \text{for max } (W, H) > 8 \end{cases} \quad (3-12)$$

Here, each coefficient of the matrix A is represented with 8 bit precision. The set $S_0$ consists of 16 matrices $$A_0^i, i \in \{0, \ldots , 15\}$$

each of which has 16 rows and 4 columns and 16 offset vectors $$b_0^i, i \in \{0, \ldots , 16\}$$

each of size 16. Matrices and offset vectors of that set are used for blocks of size 4×4. The set $S_1$ consists of 8 matrices $$A_1^i, i \in \{0, \ldots , 7\},$$

each of which has 16 rows and 8 columns and 8 offset vectors $$b_1^i, i \in \{0, \ldots , 7\}$$

each of size 16. The set $S_2$ consists of 6 matrices $$A_2^i, i \in \{0, \ldots , 5\},$$

each of which has 64 rows and 8 columns and of 6 offset vectors $$b_2^i, i \in \{0, \ldots , 5\}$$

of size 64.

2.1.6.3 Interpolation

The prediction signal at the remaining positions is generated from the prediction signal on the subsampled set by linear interpolation which is a single step linear interpolation in each direction. The interpolation is performed firstly in the horizontal direction and then in the vertical direction regardless of block shape or block size.

2.1.6.4 Signaling of MIP Mode and Harmonization with Other Coding Tools

For each Coding Unit (CU) in intra mode, a flag indicating whether an MIP mode is to be applied or not is sent. If an MIP mode is to be applied, MIP mode (predModeIntra) is signaled. For an MIP mode, a transposed flag (isTransposed), which determines whether the mode is transposed, and MIP mode Id (modeId), which determines which matrix is to be used for the given MIP mode is derived as follows:

$$isTransposed = predModeIntra \, \&1 \quad (3-13)$$
$$modeId = predModeIntra >> 1.$$

MIP coding mode is harmonized with other coding tools by considering following aspects:

LFNST is enabled for MIP on large blocks. Here, the LFNST transforms of planar mode are used.

The reference sample derivation for MIP is performed exactly as for the conventional intra prediction modes.

For the upsampling step used in the MIP-prediction, original reference samples are used instead of down-sampled ones.

Clipping is performed before upsampling and not after upsampling.

MIP is allowed up to 64×64 regardless of the maximum transform size.

The number of MIP modes is 32 for sizeId=0, 16 for sizeId=1 and 12 for sizeId=2.

2.3 Screen Content Coding Tools in VVC 2.3.1 Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signalled with a flag and it can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

2.3.1.1 IBC Reference Region

To reduce memory consumption and decoder complexity, the IBC in VVC allows only the reconstructed portion of the predefined area including the region of current CTU and some region of the left CTU. FIGS. 12A-12D illustrate example diagrams 1210, 1230, 1250 and 1270 showing current CTU processing order and its available reference samples in current and left CTU. FIGS. 12A-12D illustrate the reference region of IBC Mode, where each block represents 64×64 luma sample unit.

Depending on the location of the current coding CU location within the current CTU, the following applies:

If current block falls into the top-left 64×64 block of the current CTU, then in addition to the already reconstructed samples in the current CTU, it can also refer to the reference samples in the bottom-right 64×64 blocks of the left CTU, using CPR mode. The current block can also refer to the reference samples in the bottom-left 64×64 block of the left CTU and the reference samples in the top-right 64×64 block of the left CTU, using CPR mode.

If current block falls into the top-right 64×64 block of the current CTU, then in addition to the already reconstructed samples in the current CTU, if luma location (0, 64) relative to the current CTU has not yet been reconstructed, the current block can also refer to the reference samples in the bottom-left 64×64 block and bottom-right 64×64 block of the left CTU, using CPR mode; otherwise, the current block can also refer to reference samples in bottom-right 64×64 block of the left CTU.

If current block falls into the bottom-left 64×64 block of the current CTU, then in addition to the already reconstructed samples in the current CTU, if luma location (64, 0) relative to the current CTU has not yet been reconstructed, the current block can also refer to the reference samples in the top-right 64×64 block and bottom-right 64×64 block of the left CTU, using CPR mode. Otherwise, the current block can also refer to the reference samples in the bottom-right 64×64 block of the left CTU, using CPR mode.

If current block falls into the bottom-right 64×64 block of the current CTU, it can only refer to the already reconstructed samples in the current CTU, using CPR mode.

This restriction allows the IBC mode to be implemented using local on-chip memory for hardware implementations.

2.3.1.2 IBC Interaction with Other Coding Tools

The interaction between IBC mode and other inter coding tools in VVC, such as pairwise merge candidate, history based motion vector predictor (HMVP), combined intra/inter prediction mode (CIIP), merge mode with motion vector difference (MMVD), and geometric partitioning mode (GPM) are as follows:

IBC can be used with pairwise merge candidate and HMVP. A new pairwise IBC merge candidate can be generated by averaging two IBC merge candidates. For HMVP, IBC motion is inserted into history buffer for future referencing.

IBC cannot be used in combination with the following inter tools: affine motion, CIIP, MMVD, and GPM.

IBC is not allowed for the chroma coding blocks when DUAL_TREE partition is used.

Unlike in the HEVC screen content coding extension, the current picture is no longer included as one of the reference pictures in the reference picture list 0 for IBC prediction. The derivation process of motion vectors for IBC mode excludes all neighboring blocks in inter mode and vice versa. The following IBC design aspects are applied:

IBC shares the same process as in regular MV merge including with pairwise merge candidate and history based motion predictor, but disallows TMVP and zero vector because they are invalid for IBC mode.

Separate HMVP buffer (5 candidates each) is used for conventional MV and IBC.

Block vector constraints are implemented in the form of bitstream conformance constraint, the encoder needs to ensure that no invalid vectors are present in the bitstream, and merge shall not be used if the merge candidate is invalid (out of range or 0). Such bitstream conformance constraint is expressed in terms of a virtual buffer as described below.

For deblocking, IBC is handled as inter mode.

If the current block is coded using IBC prediction mode, AMVR does not use quarter-pel; instead, AMVR is signaled to only indicate whether MV is inter-pel or 4 integer-pel.

The number of IBC merge candidates can be signalled in the slice header separately from the numbers of regular, subblock, and geometric merge candidates.

A virtual buffer concept is used to describe the allowable reference region for IBC prediction mode and valid block vectors. Denote CTU size as ctbSize, the virtual buffer, ibcBuf, has width being wIbcBuf=128×128/ctbSize and height hIbcBuf=ctbSize. For example, for a CTU size of 128×128, the size of ibcBuf is also 128×128; for a CTU size of 64×64, the size of ibcBuf is 256×64; and a CTU size of 32×32, the size of ibcBuf is 512×32.

The size of a VPDU is min (ctbSize, 64) in each dimension, $W_v$=min (ctbSize, 64).

The virtual IBC buffer, ibcBuf is maintained as follows.

At the beginning of decoding each CTU row, refresh the whole ibcBuf with an invalid value−1.

At the beginning of decoding a VPDU (xVPDU, yVPDU) relative to the top-left corner of the picture, set the ibcBuf [x][y]=−1, with x=xVPDU % wIbcBuf, . . . , xVPDU % wIbcBuf+$W_v$−1: y=yVPDU % ctbSize, . . . , yVPDU % ctbSize+$W_v$−1.

After decoding a CU contains (x, y) relative to the top-left corner of the picture, set $$ibcBuf[x \% wIbcBuf][y \% ctbSize] = recSample[x][y].$$

For a block covering the coordinates (x, y), if the following is true for a block vector bv=(bv[0], bv[1]), then it is valid; otherwise, it is not valid:

$$ibcBuf[(x + bv[0])\% \, wIbcBuf][(y + bv[1])\% \, ctbSize]$$

$$\text{shall not be equal to} -1.$$

2.3.2 Block Differential Pulse Coded Modulation (BDPCM)

VVC supports block differential pulse coded modulation (BDPCM) for screen content coding. At the sequence level, a BDPCM enable flag is signalled in the SPS; this flag is signalled only if the transform skip mode (described in the next section) is enabled in the SPS.

When BDPCM is enabled, a flag is transmitted at the CU level if the CU size is smaller than or equal to MaxTsSize by MaxTsSize in terms of luma samples and if the CU is intra coded, where MaxTsSize is the maximum block size for which the transform skip mode is allowed. This flag indicates whether regular intra coding or BDPCM is used. If BDPCM is used, a BDPCM prediction direction flag is transmitted to indicate whether the prediction is horizontal or vertical. Then, the block is predicted using the regular horizontal or vertical intra prediction process with unfiltered reference samples. The residual is quantized and the difference between each quantized residual and its predictor, i.e. the previously coded residual of the horizontal or vertical (depending on the BDPCM prediction direction) neighbouring position, is coded.

For a block of size M (height)×N (width), let $r_{i,j}$, $0{\le}i{\le}M{-}1$, $0{\le}j{\le}N{-}1$ be the prediction residual. Let Q ($r_{i,j}$), $0{\le}i{\le}M{-}1$, $0{\le}j{\le}N{-}1$ denote the quantized version of the residual $r_{i,j}$. BDPCM is applied to the quantized residual values, resulting in a modified M×N array $\tilde{R}$ with elements $\tilde{r}_{i,j}$, where $\tilde{r}_{i,j}$ is predicted from its neighboring quantized residual value. For vertical BDPCM prediction mode, for $0{\le}j{\le}(N{-}1)$, the following is used to derive $\tilde{r}_{i,j}$:

$$\tilde{r}_{i,j} = \begin{cases} Q(r_{i,j}), & i = 0 \\ Q(r_{i,j}) - Q(r_{(i-1),j}), & 1 \le i \le (M-1) \end{cases} \qquad (3\text{-}14)$$

For horizontal BDPCM prediction mode, for $0{\le}i{\le}(M{-}1)$, the following is used to derive $\tilde{r}_{i,j}$:

$$\tilde{r}_{i,j} = \begin{cases} Q(r_{i,j}), & j = 0 \\ Q(r_{i,j}) - Q(r_{i,(j-1)}), & 1 \le j \le (N-1) \end{cases} \qquad (3\text{-}15)$$

At the decoder side, the above process is reversed to compute Q($r_{i,j}$), $0{\le}i{\le}M{-}1$, $0{\le}j{\le}N{-}1$, as follows:

$$Q(r_{i,j}) = \sum\nolimits_{k=0}^{i} \tilde{r}_{k,j}, \quad \text{if vertical BDPCM is used,} \qquad (3\text{-}16)$$

$$Q(r_{i,j}) = \sum\nolimits_{k=0}^{j} \tilde{r}_{i,k}, \quad \text{if horizontal BDPCM is used.} \qquad (3\text{-}17)$$

The inverse quantized residuals, $Q^{-1}(Q(r_{i,j}))$, are added to the intra block prediction values to produce the reconstructed sample values.

The predicted quantized residual values $\tilde{r}_{i,j}$ are sent to the decoder using the same residual coding process as that in transform skip mode residual coding. For lossless coding, if slice_ts_residual_coding_disabled_flag is set to 1, the quantized residual values are sent to the decoder using regular transform residual coding as described in 3.6.2. In terms of the MPM mode for future intra mode coding, horizontal or vertical prediction mode is stored for a BDPCM-coded CU if the BDPCM prediction direction is horizontal or vertical, respectively. For deblocking, if both blocks on the sides of a block boundary are coded using BDPCM, then that particular block boundary is not deblocked.

2.3.3 Residual Coding for Transform Skip Mode

VVC allows the transform skip mode to be used for luma blocks of size up to MaxTsSize by MaxTsSize, where the value of MaxTsSize is signaled in the PPS and can be at most 32. When a CU is coded in transform skip mode, its prediction residual is quantized and coded using the transform skip residual coding process. This process is modified from the transform coefficient coding process described in 3.6.2. In transform skip mode, the residuals of a TU are also coded in units of non-overlapped subblocks of size 4×4. For better coding efficiency, some modifications are made to customize the residual coding process towards the residual signal's characteristics. The following summarizes the differences between transform skip residual coding and regular transform residual coding:

Forward scanning order is applied to scan the subblocks within a transform block and also the positions within a subblock;

no signalling of the last (x, y) position;

coded_sub_block_flag is coded for every subblock except for the last subblock when all previous flags are equal to 0;

sig_coeff_flag context modelling uses a reduced template, and context model of sig_coeff_flag depends on top and left neighbouring values;

context model of abs_level_gt1 flag also depends on the left and top sig_coeff_flag values;

par_level_flag using only one context model;

additional greater than 3, 5, 7, 9 flags are signalled to indicate the coefficient level, one context for each flag;

Rice parameter derivation using fixed order=1 for the binarization of the remainder values;

context model of the sign flag is determined based on left and above neighbouring values and the sign flag is parsed after sig_coeff_flag to keep all context coded bins together.

Figure 13:
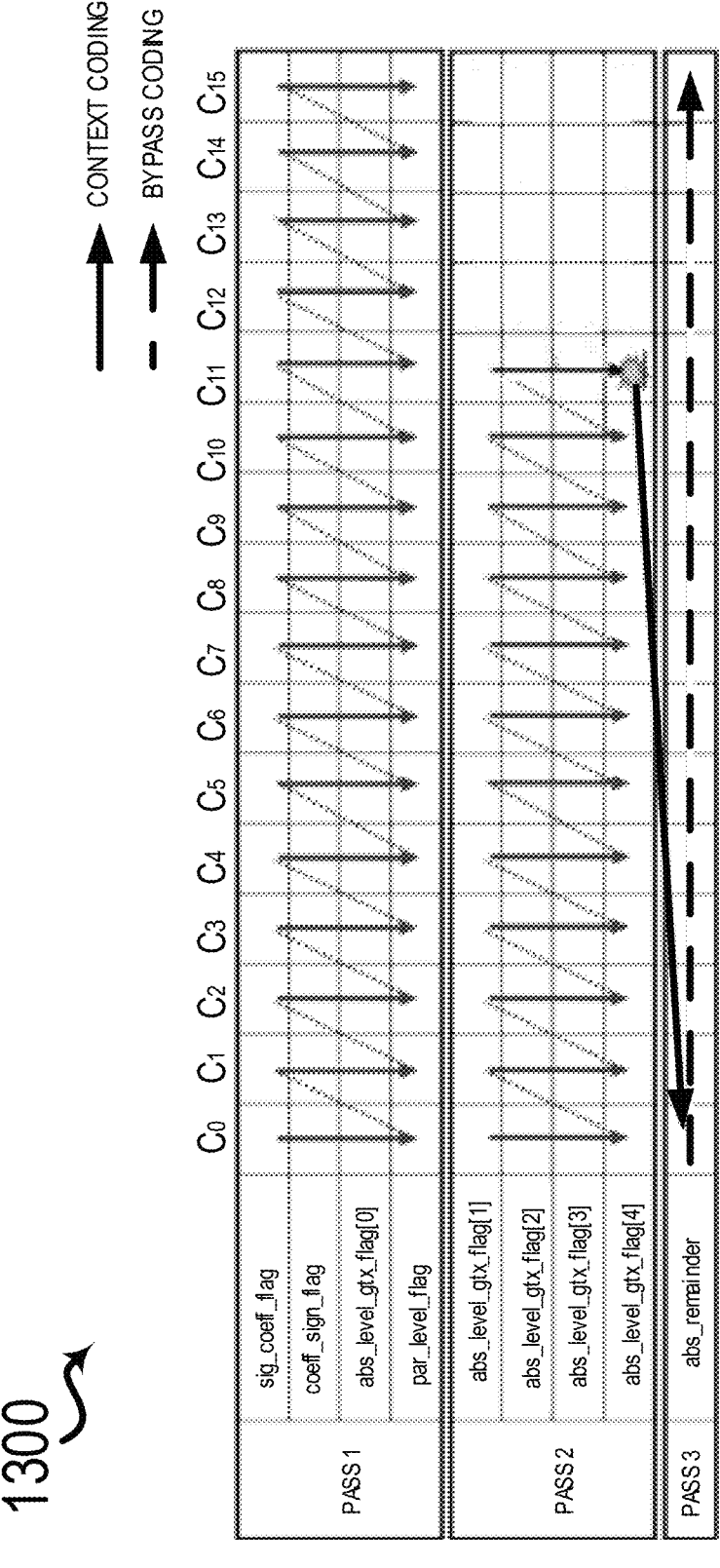
FIG. 13 illustrates residual coding passes for transform skip blocks.

FIG. 13 illustrates an example diagram 1300 showing a residual coding passes for transform skip blocks. For each subblock, if the coded_subblock_flag is equal to 1 (i.e., there is at least one non-zero quantized residual in the subblock), coding of the quantized residual levels is performed in three scan passes (see FIG. 13):

First scan pass: significance flag (sig_coeff_flag), sign flag (coeff_sign_flag), absolute level greater than 1 flag (abs_level_gtx_flag[0]), and parity (par_level_flag) are coded. For a given scan position, if sig_coeff_flag is equal to 1, then coeff_sign_flag is coded, followed by the abs_level_gtx_flag[0] (which specifies whether the absolute level is greater than 1). If abs_level_gtx_flag [0] is equal to 1, then the par_level_flag is additionally coded to specify the parity of the absolute level.

Greater-than-x scan pass: for each scan position whose absolute level is greater than 1, up to four abs_level_gtx_flag[i] for i=1 . . . 4 are coded to indicate if the absolute level at the given position is greater than 3, 5, 7, or 9, respectively.

Remainder scan pass: The remainder of the absolute level abs_remainder are coded in bypass mode. The remainder of the absolute levels are binarized using a fixed Rice parameter value of 1.

The bins in scan passes #1 and #2 (the first scan pass and the greater-than-x scan pass) are context coded until the maximum number of context coded bins in the TU have been exhausted. The maximum number of context coded bins in a residual block is limited to 1.75*block_width* block_height, or equivalently, 1.75 context coded bins per sample position on average. The bins in the last scan pass (the remainder scan pass) are bypass coded. A variable, RemCcbs, is first set to the maximum number of context-coded bins for the block and is decreased by one each time a context-coded bin is coded. While RemCcbs is larger than or equal to four, syntax elements in the first coding pass, which includes the sig_coeff_flag, coeff_sign_flag, abs_level_gt1_flag and par_level_flag, are coded using context-coded bins. If RemCcbs becomes smaller than 4 while coding the first pass, the remaining coefficients that have yet to be coded in the first pass are coded in the remainder scan pass (pass #3).

After completion of first pass coding, if RemCcbs is larger than or equal to four, syntax elements in the second coding pass, which includes abs_level_gt3_flag, abs_level_gt5_flag, abs_level_gt7_flag, and abs_level_gt9_flag, are coded using context coded bins. If the RemCcbs becomes smaller than 4 while coding the second pass, the remaining coefficients that have yet to be coded in the second pass are coded in the remainder scan pass (pass #3).

FIG. 13 illustrates the transform skip residual coding process. The star marks the position when context coded bins are exhausted, at which point all remaining bins are coded using bypass coding.

Further, for a block not coded in the BDPCM mode, a level mapping mechanism is applied to transform skip residual coding until the maximum number of context coded bins has been reached. Level mapping uses the top and left neighbouring coefficient levels to predict the current coefficient level in order to reduce signalling cost. For a given residual position, denote absCoeff as the absolute coefficient level before mapping and absCoeffMod as the coefficient level after mapping. Let $X_0$ denote the absolute coefficient level of the left neighbouring position and let $X_1$ denote the absolute coefficient level of the above neighbouring position. The level mapping is performed as follows:

```
pred=max (X0, X1);
if (absCoeff==pred)
    absCoeffMod=1;
else
    absCoeffMod=(absCoeff<pred)? absCoeff+1: absCoeff;
```

Then, the absCoeffMod value is coded as described above. After all context coded bins have been exhausted, level mapping is disabled for all remaining scan positions in the current block.

2.3.4 Residual Coding for Transform Skip Mode in VVC Version 2

Version 2 of VVC extends support to bit depths above 10 bits when typically coefficients have a greater magnitude. To efficiently code such coefficients a Rice parameter other than the constant value of 1, as used in VVC version 1, is required.

VVC version 2 includes Extended Transform Skip Residual Coding (ETSRC) which is enabled using sps_ts_residual_coding_rice_present_in_sh_flag. If sh_ts_residual_coding_disabled_flag is set to 0 and sps_ts_residual_coding_rice_present_in_sh_flag is set to 1, the value sh_ts_residual_coding_rice_idx_minus1 is read from the bit slice header. The Rice parameter used for all transform skip residual coding in the slice is then given by:

$$RicePara = sh\_ts\_residual\_coding\_rice\_idx\_minus1 + 1. \qquad (3-18)$$

2.3.5 Palette Mode

In VVC, the palette mode is used for screen content coding in all of the chroma formats supported in a 4:4:4 profile (that is, 4:4:4, 4:2:0, 4:2:2 and monochrome). When palette mode is enabled, a flag is transmitted at the CU level if the CU size is smaller than or equal to 64×64, and the amount of samples in the CU is greater than 16 to indicate whether palette mode is used. Considering that applying palette mode on small CUs introduces insignificant coding gain and brings extra complexity on the small blocks, palette mode is disabled for CU that are smaller than or equal to 16 samples. A palette coded coding unit (CU) is treated as a prediction mode other than intra prediction, inter prediction, and intra block copy (IBC) mode.

If the palette mode is utilized, the sample values in the CU are represented by a set of representative colour values. The set is referred to as the palette. For positions with sample values close to the palette colours, the palette indices are signalled. It is also possible to specify a sample that is outside the palette by signalling an escape symbol. For samples within the CU that are coded using the escape symbol, their component values are signalled directly using (possibly) quantized component values. FIG. 14 illustrates an example diagram 1400 of a block coded in palette mode This is illustrated in FIG. 14. The quantized escape symbol is binarized with fifth order Exp-Golomb binarization process (EG5).

For coding of the palette, a palette predictor is maintained. The palette predictor is initialized to 0 at the beginning of each slice for non-wavefront case. For WPP case, the palette predictor at the beginning of each CTU row is initialized to the predictor derived from the first CTU in the previous CTU row so that the initialization scheme between palette predictors and CABAC synchronization is unified. For each entry in the palette predictor, a reuse flag is signalled to indicate whether it is part of the current palette in the CU. The reuse flags are sent using run-length coding of zeros. After this, the number of new palette entries and the component values for the new palette entries are signalled. After encoding the palette coded CU, the palette predictor will be updated using the current palette, and entries from the previous palette predictor that are not reused in the current palette will be added at the end of the new palette predictor until the maximum size allowed is reached. An escape flag is signaled for each CU to indicate if escape symbols are present in the current CU. If escape symbols are present, the palette table is augmented by one and the last index is assigned to be the escape symbol.

In a similar way as the coefficient group (CG) used in transform coefficient coding, a CU coded with palette mode is divided into multiple line-based coefficient group, each consisting of m samples (i.e., m=16), where index runs, palette index values, and quantized colors for escape mode are encoded/parsed sequentially for each CG. FIG. 15A illustrates an example diagram 1500 showing subblock-based index map scanning for palette for horizontal scanning. FIG. 15B illustrates an example diagram 1550 showing subblock-based index map scanning for palette for vertical scanning. Same as in HEVC, horizontal or vertical traverse scan can be applied to scan the samples, as shown in FIGS. 15A and 15B.

The encoding order for palette run coding in each segment is as follows: For each sample position, 1 context coded bin run_copy_flag=0 is signalled to indicate if the pixel is of the same mode as the previous sample position, i.e., if the previously scanned sample and the current sample are both of run type COPY_ABOVE or if the previously scanned sample and the current sample are both of run type INDEX and the same index value. Otherwise, run_copy_flag=1 is signaled. If the current sample and the previous sample are of different modes, one context coded bin copy_above_pal-ette_indices_flag is signaled to indicate the run type, i.e., INDEX or COPY_ABOVE, of the current sample. Here, decoder doesn't have to parse run type if the sample is in the first row (horizontal traverse scan) or in the first column (vertical traverse scan) since the INDEX mode is used by default. With the same way, decoder doesn't have to parse run type if the previously parsed run type is COPY_ABOVE. After palette run coding of samples in one coding pass, the index values (for INDEX mode) and quantized escape colors are grouped and coded in another coding pass using CABAC bypass coding. Such separation of context coded bins and bypass coded bins can improve the through-put within each line CG.

For slices with dual luma/chroma tree, palette is applied on luma (Y component) and chroma (Cb and Cr compo-nents) separately, with the luma palette entries containing only Y values and the chroma palette entries containing both Cb and Cr values. For slices of single tree, palette will be applied on Y, Cb, Cr components jointly, i.e., each entry in the palette contains Y, Cb, Cr values, unless when a CU is coded using local dual tree, in which case coding of luma and chroma is handled separately. In this case, if the corre-sponding luma or choma blocks are coded using palette mode, their palette is applied in a way similar to the dual tree case (this is related to non-4:4:4 coding and will be further explained in 2.2.5.1).

For slices coded with dual tree, the maximum palette predictor size is 63, and the maximum palette table size for coding of the current CU is 31. For slices coded with dual tree, the maximum predictor and palette table sizes are halved, i.e., maximum predictor size is 31 and maximum table size is 15, for each of the luma palette and the chroma palette. For deblocking, the palette coded block on the sides of a block boundary is not deblocked.

2.3.5.1 Palette Mode for Non-4:4:4 Content

Palette mode in VVC is supported for all chroma formats in a similar manner as the palette mode in HEVC SCC. For non-4:4:4 content, the following customization is applied:

1. When signaling the escape values for a given sample position, if that sample position has only the luma component but not the chroma component due to chroma subsampling, then only the luma escape value is signaled. This is the same as in HEVC SCC.
2. For a local dual tree block, the palette mode is applied to the block in the same way as the palette mode applied to a single tee block with two exceptions:
   a. The process of palette predictor update is slightly modified as follows. Since the local dual tree block only contains luma (or chroma) component, the predictor update process uses the signalled value of luma (or chroma) component and fills the "missing" chroma (or luma) component by setting it to a default value of $(1<<(\text{component bit depth}-1))$.
   b. The maximum palette predictor size is kept at 63 (since the slice is coded using single tree) but the maximum palette table size for the luma/chroma block is kept at 15 (since the block is coded using separate palette).
3. For palette mode in monochrome format, the number of colour components in a palette coded block is set to 1 instead of 3.

2.3.5.2 Encoder Algorithm for Palette Mode

At the encoder side, the following steps are used to produce the palette table of the current CU.

1. First, to derive the initial entries in the palette table of the current CU, a simplified K-means clustering is applied. The palette table of the current CU is initial-ized as an empty table. For each sample position in the CU, the SAD between this sample and each palette table entry is calculated and the minimum SAD among all palette table entries is obtained. If the minimum SAD is smaller than a pre-defined error limit, error-Limit, then the current sample is clustered together with the palette table entry with the minimum SAD. Otherwise, a new palette table entry is created. The threshold errorLimit is QP-dependent and is retrieved from a look-up table containing 57 elements covering the entire QP range. After all samples of the current CU have been processed, the initial palette entries are sorted according to the number of samples clustered together with each palette entry, and any entry after the $31^{st}$ entry is discarded.

2. In the second step, the initial palette table colours are adjusted by considering two options: using the centroid of each cluster from step 1 or using one of the palette colours in the palette predictor. The option with lower rate-distortion cost is selected to be the final colours of the palette table. If a cluster has only a single sample and the corresponding palette entry is not in the palette predictor, the corresponding sample is converted to an escape symbol in the next step.

3. A palette table thus generated contains some new entries from the centroids of the clusters in step 1, and some entries from the palette predictor. So this table is reordered again such that all new entries (i.e. the centroids) are put at the beginning of the table, fol-lowed by entries from the palette predictor.

Given the palette table of the current CU, the encoder selects the palette index of each sample position in the CU. For each sample position, the encoder checks the RD cost of all index values corresponding to the palette table entries, as well as the index representing the escape symbol, and selects the index with the smallest RD cost using the following equation:

$$\text{RD cost}=\text{distortion}\times(\text{isChroma}?0.8:1)+\text{lambda}\times\text{by-pass coded bits} \qquad (3\text{-}19).$$

After deciding the index map of the current CU, each entry in the palette table is checked to see if it is used by at least one sample position in the CU. Any unused palette entry will be removed. After the index map of the current CU is decided, trellis RD optimization is applied to find the best values of run_copy_flag and run type for each sample position by comparing the RD cost of three options: same as the previously scanned position, run type COPY_ABOVE, or run type INDEX. When calculating the SAD values, sample values are scaled down to 8 bits, unless the CU is coded in lossless mode, in which case the actual input bit depth is used to calculate the SAD. Further, in the case of lossless coding, only rate is used in the rate-distortion optimization steps mentioned above (because lossless cod-ing incurs no distortion).

2.3.6 Adaptive Color Transform

Figure 16:
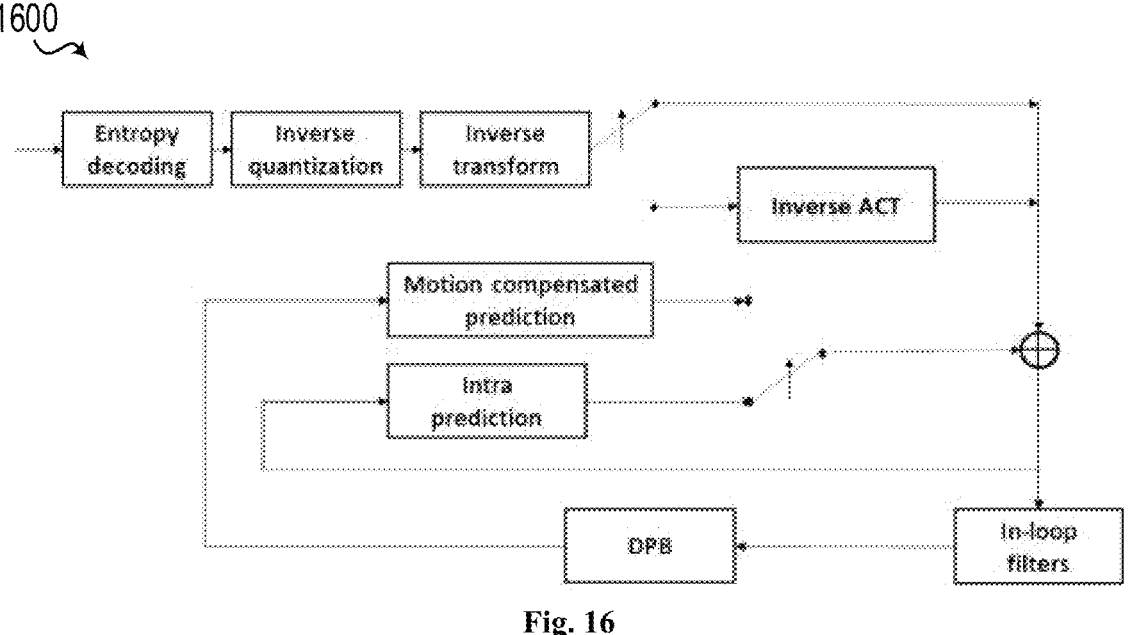
FIG. 16 illustrates a decoding flowchart with ACT.

In HEVC SCC extension, adaptive color transform (ACT) was applied to reduce the redundancy between three color components in 444 chroma format. The ACT is also adopted into the VVC standard to enhance the coding efficiency of 444 chroma format coding. Same as in HEVC SCC, the ACT performs in-loop color space conversion in the prediction residual domain by adaptively converting the residuals from the input color space to YCgCo space. FIG. 16 illustrates a decoding flowchart 1600 with ACT. FIG. 16 illustrates the decoding flowchart with the ACT being applied. Two color spaces are adaptively selected by signaling one ACT flag at CU level. When the flag is equal to one, the residuals of the CU are coded in the YCgCo space; otherwise, the residuals of the CU are coded in the original color space. Additionally, same as the HEVC ACT design, for inter and IBc CUs, the ACT is only enabled when there is at least one non-zero coefficient in the CU. For intra CUs, the ACT is only enabled when chroma components select the same intra prediction mode of luma component, i.e., DM mode.

2.3.6.1 ACT Mode

In HEVC SCC extension, the ACT supports both lossless and lossy coding based on lossless flag (i.e., cu_transquant_bypass_flag). However, there is no flag signalled in the bitstream to indicate whether lossy or lossless coding is applied. Therefore, YCgCo-R transform is applied as ACT to support both lossy and lossless cases. The YCgCo-R reversible colour transform is shown as below.

| Forward Conversion: GBR to YCgCo | Backward Conversion: YCgCo to GBR |
|---|---|
| Co = R − B; | t = Y − (Cg >> 1) |
| t = B + (Co >> 1); | G = Cg + t |
| Cg = G − t; | B = t − (Co >> 1) |
| Y = t + (Cg >> 1); | R = Co + B |

Since the YCgCo-R transform are not normalized. To compensate the dynamic range change of residuals signals before and after color transform, the QP adjustments of (−5, 1, 3) are applied to the transform residuals of Y, Cg and Co components, respectively. The adjusted quantization parameter only affects the quantization and inverse quantization of the residuals in the CU. For other coding processes (such as deblocking), original QP is still applied.

Additionally, because the forward and inverse color transforms need to access the residuals of all three components, the ACT mode is always disabled for separate-tree partition and ISP mode where the prediction block size of different color component is different. Transform skip (TS) and block differential pulse coded modulation (BDPCM), which are extended to code chroma residuals, are also enabled when the ACT is applied.

2.3.6.2 ACT Fast Encoding Algorithms

To avoid brutal R-D search in both the original and converted color spaces, the following fast encoding algorithms are applied in the VTM reference software to reduce the encoder complexity when the ACT is enabled.

The order of RD checking of enabling/disabling ACT is dependent on the original color space of input video. For RGB videos, the RD cost of ACT mode is checked first; for YCbCr videos, the RD cost of non-ACT mode is checked first. The RD cost of the second color space is checked only if there is at least one non-zero coefficient in the first color space.

The same ACT enabling/disabling decision is reused when one CU is obtained through different partition path. Specifically, the selected color space for coding the residuals of one CU will be stored when the CU is coded at the first time. Then, when the same CU is obtained by another partition path, instead of checking the RD costs of the two spaces, the stored color space decision will be directly reused.

The RD cost of a parent CU is used to decide whether to check the RD cost of the second color space for the current CU. For instance, if the RD cost of the first color space is smaller than that of the second color space for the parent CU, then for the current CU, the second color space is not checked.

To reduce the number of tested coding modes, the selected coding mode is shared between two color spaces. Specifically, for intra mode, the preselected intra mode candidates based on SATD-based intra mode selection are shared between two color spaces. For inter and IBC modes, block vector search or motion estimation is performed only once. The block vectors and motion vectors are shared by two color spaces. Input to this process is:

a luma location (xCb, yCb) specifying the top-left sample of the current chroma coding block relative to the top-left luma sample of the current picture.

Output to this process is:

a variable CclmEnabled specifying if a cross-component chroma intra prediction mode is enabled (TRUE) or not enabled (FALSE) for the current chroma coding block.

The variable CclmEnabled is derived as follows:

If sps_cclm_enabled_flag is equal to 0, CclmEnabled is set equal to 0.

Otherwise, if one or more of the following conditions are true, CclmEnabled is set equal to 1:

sps_qtbtt_dual_tree_intra_flag is equal to 0.

sh_slice_type is not equal to I.

CtbLog2SizeY is less than 6.

Otherwise the following applies:

The variables xCb64, yCb64, yCb32 are derived as follows:

$$xCb64 = (xCb >> 6) << 6$$

$$yCb64 = (yCb >> 6) << 6$$

$$yCb32 = (yCb >> 5) << 5$$

The variable CclmEnabled is derived as follows:

If one or more of the following conditions are true, the variable CclmEnabled is set equal to 1:

CbWidth[1][xCb64][yCb64] is equal to 64 and CbHeight[1][xCb64][yCb64] is equal to 64.

CqtDepth[1][xCb64][yCb64] is equal to CtbLog2SizeY−6, MttSplitMode[xCb64][yCb64][0] is equal to SPLIT_BT_HOR, CbWidth[1][xCb64][yCb32] is equal to 64 and CbHeight[1][xCb64][yCb32] is equal to 32.

CqtDepth[1][xCb64][yCb64] is greater than CtbLog2SizeY−6.

CqtDepth[1][xCb64][yCb64] is equal to CtbLog2SizeY−6, MttSplitMode[xCb64][yCb64][0] is equal to SPLIT_BT_HOR, and MttSplitMode[xCb64][yCb32][1] is equal to SPLIT_BT_VER.

Otherwise, the variable CclmEnabled is set equal to 0.

When CclmEnabled is equal to 1 and one of the following conditions is true, CclmEnabled is set equal to 0:

CbWidth[0][xCb64][yCb64] and CbHeight[0][xCb64][yCb64] are both equal to 64, and IntraSubPartitionsModeFlag[xCb64][yCb64] is equal to 1.

CbWidth[0][xCb64][yCb64] or CbHeight[0][xCb64][yCb64] is less than 64, and CqtDepth[0][xCb64][yCb64] is equal to CtbLog2SizeY−6.

3 Intra Prediction Tools Under Investigation in
ECM 3.1.1 Multi-Model LM (MMLM)

CCLM included in VVC is extended by adding three Multi-model LM (MMLM) modes. In each MMLM mode, the reconstructed neighboring samples are classified into two classes using a threshold which is the average of the luma reconstructed neighboring samples. The linear model of each class is derived using the Least-Mean-Square (LMS) method. For the CCLM mode, the LMS method is also used to derive the linear model.

The smallest chroma intra prediction unit (SCIPU) constraint is removed. In addition, the VPDU constraint for reducing CCLM prediction latency is also removed.

3.1.2 Gradient PDPC

In VVC, for a few scenarios, PDPC may not be applied due to the unavailability of the secondary reference samples. In these cases, a gradient based PDPC, extended from horizontal/vertical mode, is applied. The PDPC weights (wT/wL) and nScale parameter for determining the decay in PDPC weights with respect to the distance from left/top boundary are set equal to corresponding parameters in horizontal/vertical mode, respectively. When the secondary reference sample is at a fractional sample position, bilinear interpolation is applied.

3.1.3 Secondary MPM

Figure 17:
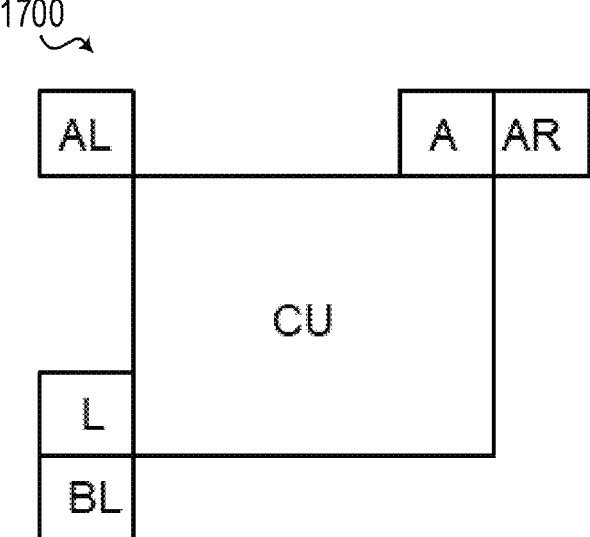
FIG. 17 illustrates neighbouring blocks (L, A, BL, AR, AL) used in the derivation of a general MPM list.

Secondary MPM lists is introduced. The existing primary MPM (PMPM) list consists of 6 entries and the secondary MPM (SMPM) list includes 16 entries. A general MPM list with 22 entries is constructed first, and then the first 6 entries in this general MPM list are included into the PMPM list, and the rest of entries form the SMPM list. The first entry in the general MPM list is the Planar mode. FIG. 17 illustrates an example diagram 1700 showing neighbouring blocks (L, A, BL, AR, AL) used in the derivation of a general MPM list. The remaining entries are composed of the intra modes of the left (L), above (A), below-left (BL), above-right (AR), and above-left (AL) neighbouring blocks as shown in FIG. 17, the directional modes with added offset from the first two available directional modes of neighbouring blocks, and the default modes.

If a CU block is vertically oriented, the order of neighbouring blocks is A, L, BL, AR, AL; otherwise, it is L, A, BL, AR, AL.

A PMPM flag is parsed first, if equal to 1 then a PMPM index is parsed to determine which entry of the PMPM list is selected, otherwise the SPMPM flag is parsed to determine whether to parse the SMPM index or the remaining modes.

3.1.4 Reference sample interpolation and smoothing for intra-prediction

The 4-tap cubic interpolation is replaced with a 6-tap cubic interpolation filter, for the derivation of predicted samples from the reference samples.

For reference sample filtering, a 6-tap gaussian filter is applied for larger blocks (W>=32 and H>=32), existing VVC 4-tap gaussian interpolation filter is applied otherwise. The extended intra reference samples are derived using the 4-tap interpolation filter instead of the nearest neighbor rounding.

3.1.5 Decoder Side Intra Mode Derivation (DIMD)

When DIMD is applied, two intra modes are derived from the reconstructed neighbor samples, and those two predictors are combined with the planar mode predictor with the weights derived from the gradients.

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

3.1.6 Intra Template Matching

Intra template matching prediction (Intra TMP) is a special intra prediction mode that copies the best prediction block from the reconstructed part of the current frame, whose L-shaped template matches the current template. For a predefined search range, the encoder searches for the most similar template to the current template in a reconstructed part of the current frame and uses the corresponding block as a prediction block. The encoder then signals the usage of this mode, and the same prediction operation is performed at the decoder side.

Figure 18:
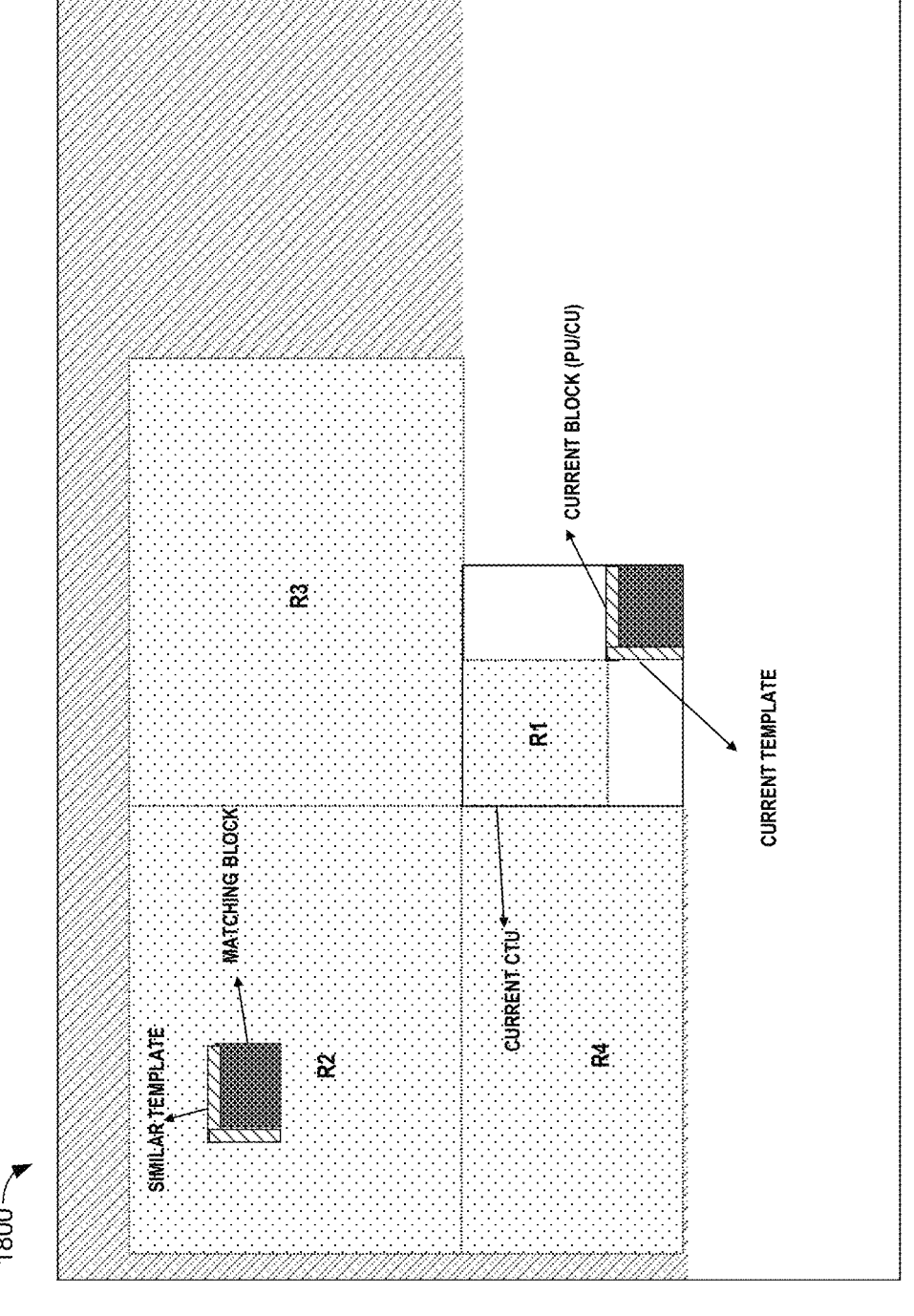
FIG. 18 illustrates an intra template matching search area used.

FIG. 18 illustrates an example diagram 1800 showing an intra template matching search area used. The prediction signal is generated by matching the L-shaped causal neighbor of the current block with another block in a predefined search area in FIG. 18 consisting of:

R1: current CTU,
R2: top-left CTU,
R3: above CTU,
R4: left CTU.

SAD is used as a cost function.

Within each region, the decoder searches for the template that has least SAD with respect to the current one and uses its corresponding block as a prediction block.

The dimensions of all regions (SearchRange_w, SearchRange_h) are set proportional to the block dimension (BlkW, BlkH) to have a fixed number of SAD comparisons per pixel. That is:

$$SearchRange\_w = a * B1kW,$$

$$SearchRange\_h = a * B1kH.$$

Where 'a' is a constant that controls the gain/complexity trade-off. In practice, 'a' is equal to 5. The Intra template matching tool is enabled for CUs with size less than or equal to 64 in width and height. This maximum CU size for Intra template matching is configurable.

The Intra template matching prediction mode is signaled at CU level through a dedicated flag.

3.1.7 Fusion for Template-Based Intra Mode Derivation (TIMD)

For each intra prediction mode in MPMs, The SATD between the prediction and reconstruction samples of the template is calculated. First two intra prediction modes with the minimum SATD is selected as the TIMD modes. These two TIMD modes are fused with the weights, and such weighted intra prediction is used to code the current CU. Position dependent intra prediction combination (PDPC) is included in the derivation of the TIMD modes.

The costs of the two selected modes are compared with a threshold, in the test the cost factor of 2 is applied as follows:

$$costMode2 < 2 * costMode1.$$

If this condition is true, the fusion is applied, otherwise the only model is used.

Weights of the modes are computed from their SATD costs as follows:

$$weight1 = costMode2/(costMode1 + costMode2),$$

$$weight2 = 1 - weight1.$$

4 Problems

The existing designs for cross-component prediction have following problems:

1) Certain regions of image/video, especially in the screen content sequences, the regions are composed of a set of few distinct colors. These distinct colors need not exhibit linear or piece-wise linear cross-component correlations, as modeled in the existing codecs. This motivates for a novel cross-component prediction mechanism tailored to such contents to achieve improved prediction.

2) Palette coding as designed in earlier codecs like HEVC considers color triplets as a palette entry. Such a design implicitly accounts for cross-component correlations. However, in recent codecs like VVC, ECM, that have dual-tree setting, a simple design of using separate palette for luma and chroma is used. Such a design completely ignores cross-component correlations. This necessitates for methods to bridge the gap between luma and chroma components, calling for a novel cross-component prediction mechanism in palette coding.

3) For non 4:4:4 content, the cross-component prediction models in regular intra mode and the model to be disclosed in palette mode is based on downsized luma samples. The accuracy of the model depends on the down-sampling operation. Therefore, advanced techniques may be applied for down-sampling luma for accurate model derivation.

5 Detailed Description

To solve the above problems and some other problems not mentioned, methods as summarized below are disclosed. The embodiments should be considered as examples to explain the general concepts and should not be interpreted in a narrow way. The embodiments are discussed in the context of YUV format. Similar rationale applies to other color spaces such as RGB.

Furthermore, these embodiments can be applied individually or combined in any manner.

In the following discussion, a boundary sample may refer to a reconstructed neighboring sample adjacent to or non-adjacent to the current block.

A boundary luma sample may refer to a reconstructed luma sample that corresponds to a chroma neighboring sample adjacent to or non-adjacent to the current chroma block.

A reference line may refer to a vertical or horizontal line of reconstructed neighboring samples adjacent to or non-adjacent to the current block.

A luma sample in a reference line may refer to a reconstructed luma sample that corresponds to a chroma sample that is in a chroma reference line.

A luma sample in a region may refer to a reconstructed luma sample that corresponds to a chroma sample that is in a chroma sample region.

A luma sample corresponds (a.k.a. collocated) to a chroma may be derived as a reconstructed luma sample (such as with the color format 4:4:4), or it may be derived as a down-sampled reconstructed luma sample (such as with the color format 4:2:0). The down-sampling method may be the same to or different to the luma down-sampling method used in CCLM mode.

1. Regarding the improved prediction in cross-component prediction for solving the 1 st problem, the disclosure builds on the core observation that, for class of screen content video under consideration that comprises of regions with few distinct colors, the luma value (one color component) in a region can uniquely determine the corresponding chroma value (other color components). In the light of this observation, the following approaches are disclosed:

1) In one example, at least one (discrete) mapping function between a finite set of luma values and a finite set of chroma values is used to derive the cross-component prediction.

a. In one example, a look-up table is used that determines the predicted chroma values for a given luma value. The mapping function or the look-up table (mapping table) can be obtained as:

i. For example, the luma set is obtained as the boundary luma sample values and the mapped output for each luma value is the corresponding chroma value. In terms of look-up table, a luma-chroma pair from the boundary samples may form an entry in the look-up table.

ii. For example, the luma set is obtained as the luma samples from multiple reference lines and the mapped output for each luma value is the corresponding chroma value.

iii. For example, the luma set is obtained as the region or union of regions of reconstructed image or video, and the mapped output for each luma value is the corresponding chroma value. The method to determine such region or regions could be implicit (pre-determined) or conveyed explicitly to the decoder.

b. For example, the mapping function is learnt on the fly by dynamically updating the mapping function as new regions of image or video are reconstructed.

c. For example, for a given chroma block, if the co-located luma block/s employ intra block copy, the block vector (BV)/s from the co-located luma prediction unit/s can be used to obtain the region/s in image/video to derive the luma set and the mapped output will be the corresponding chroma values.

i. In one example, the BV can be as a displacement to locate a chroma region which is used to derive the mapping table/function.

d. For example, if intra block copy is allowed for chroma, the merge candidates for the current block are used to determine the region/s from which the mapping function is derived.

2) In one example, if the current block contains a luma value Y that is not in the input luma set, the chroma prediction can be:

a. For example, average of the entire or partial set or subset of chroma values in the mapping function.

b. In one example, one or multiple candidate luma values may be checked to find at least one in the input luma set.

i. In one example, candidate luma values may be checked in an order.

a) The order may be from closer to further, distanced from Y.

ii. The first candidate luma value that can be found in the input luma set may be used to get the chroma prediction.

iii. For example, Y+1, Y+2 and Y+3 are used as the candidates.

c. For example, min/max/mode of the set or subset of chroma values in the mapping function.

d. For example, the closest luma value in the luma set is determined and its corresponding output is used as the predicted chroma value.

e. For example, the mapped chroma prediction is equal to $(w1*F(Y0)+w1*F(Y1)+O)/(w1+w2)$, wherein F represents the mapping function; Y0 and Y1 are two luma values in the luma set closest to Y and $Y0<Y<Y1$; w1 and w2 are weighting values, and O is an integer. For example, $w1=w2=O=1$.

f. A default value.

3) In one example, if multiple chroma values are found for the same luma value, the mapped output for that luma value can be, a. For example, the average/min/max of the entire set or a subset of such multiple chroma values.

b. For example, the most recent reconstructed chroma value among the subset of such multiple chroma values.

c. In one example, when constructing the mapping table, a luma value should be unique in the table.

4) For example, when constructing the mapping table T, each valid luma value (e.g. from 0 to $2^B-1$ where B is the bit-depth) should corresponds to one entry to the table.

a. E.g. T [K] should record the mapped chroma prediction value corresponding to luma value K.

b. T [K] may comprise a value of only one chroma component.

c. T [K] may comprise multiple values of only multiple chroma components (e.g. Cb and Cr).

5) For example, when constructing the mapping table T, each entry may record a pair of luma value and chroma value.

a. E.g. T [k]={Y, C}.

b. T [k] may be in an order that Y1<Y2 if k1<k2, when T [k1]={Y1, C1} and T [k2]={Y2, C2}.

c. C may comprise a value of only one chroma component.

d. C may comprise multiple values of only multiple chroma components (e.g. Cb and Cr).

6) In one example, a syntax element (e.g., a flag) may be signaled in the bitstream to specify whether the disclosed cross-component prediction mode is finally chosen for the current block coding.

a. Furthermore, the syntax element may depend on the number of distinct colors found in the neighbors (or the number of distinct entries in the look-up table).

b. Furthermore, the syntax element may depend on the usage of dual-tree structure.

c. Alternatively, furthermore, the syntax element may be conditionally signalled.

d. Whether to/how to signal the syntax element may depend on dimensions of the current block.

i. For example, the syntax element may be only signalled in case of the current block is greater than a pre-defined size.

ii. For example, the syntax element may be only signalled in case of the sum of width and height of the current block is greater than a pre-defined threshold.

iii. For example, the syntax element may be only signalled in case the width is greater than a pre-defined threshold and/or height of the current block is greater than a pre-defined threshold.

iv. "greater than" may be replaced by "lower than" or "no greater than" or "no lower than".

7) In one example, a predicted (or mapped) chroma sample value may be output as the reconstructed sample value.

a. Alternatively, the reconstructed sample value may be derived as a sum of the predicted (or mapped) chroma sample value and a residue value.

b. In one example, the residue may be signaled from the encoder to the decoder.

c. In one example, the residues of a block may be transformed at encoder and invers-transformed at decoder.

d. In one example, the block of residues may be entropy-coded as in another mode, such as intra-mode, inter-mode or IBC mode.

2. Regarding the cross-component prediction in chroma palette coding for solving the $2^{nd}$ problem, one or more of the following approaches are disclosed:

1) In one example, the mapping approach in the first disclosure may be employed to get the chroma values, and the coding of the index map may be bypassed.

2) In one example, suppose the size of chroma palette is N, the collocated luma samples are classified into N clusters (e.g. by approaches such as k-means clustering) to get N centroids.

a. For example, each centroid is uniquely mapped to a chroma palette entry.

b. For example, while coding the current chroma block, the collocated luma sample is quantized to the nearest centroid from which the associated chroma palette entry is derived to obtain the chroma prediction/reconstruction.

c. For example, the association of the luma centroids to the palette entries may be conveyed to the decoder.

3) In one example, mapping function in (1) is applied only for the co-located luma samples whose values are found in the input (or the domain) of the mapping function. For the positions where the co-located luma sample are not in the input of the mapping function, the palette index is sent to decoder.

4) In one example, a syntax element (e.g., a flag) may be signaled in the bitstream to specify whether the disclosed cross-component prediction mode is finally chosen for the current block coding.

a. Furthermore, the syntax element may depend on whether palette coding is enabled for the current block.

b. Furthermore, the syntax element may depend on syntax elements of the palette coding such as number of reused palette entries, escape flag etc.

c. Furthermore, the syntax element may depend on the usage of dual-tree structure.

d. Alternatively, furthermore, the syntax element may be conditionally signalled.

e. Whether to/how to signal the syntax element may depend on dimensions of the current block.

i. For example, the syntax element may be only signalled in case of the current block is greater than a pre-defined size.

ii. For example, the syntax element may be only signalled in case of the sum of width and height of the current block is greater than a pre-defined threshold.

iii. For example, the syntax element may be only signalled in case the width is greater than a pre-defined threshold and/or height of the current block is greater than a pre-defined threshold.

iv. "greater than" may be replaced by "lower than" or "no greater than" or "no lower than".

3. Regarding down-sampling luma for accurate model derivation for cross-component predictions for regular intra and in palette coding for non 4:4:4 content for solving the $3^{rd}$ problem, following approaches are disclosed:

1) In one example, the down-sampled luma value is a linear combination of the luma-samples that share the chroma sample value. FIG. 19 illustrates an example diagram 1900 showing an illustration of luma down-sampling.

a. For example, the down-sampled luma value is the average of the luma-samples that share the chroma value. For example, this corresponds to location marked $C_1$ in FIG. 19.

b. For example, the down-sampled luma value is the average of the subset of the luma-samples that share the chroma value. For an example case with top two samples, this corresponds to location marked $C_2$ in FIG. 19.

2) In one example, the above-mentioned method may be extended to include additional neighboring luma samples in deriving co-located luma sample.

3) In one example, the above-mentioned methods could be extended to include filters that involve non-linear operations.

4) In one example, a syntax element (e.g., a flag) may be signalled in the bitstream to specify whether the proposed approach is finally chosen for the current block coding.

5) In one example, a filter index may be signalled to convey the filter used.

a. Furthermore, the filter index may depend on the filters chosen by the neighboring blocks.

b. The filter index may be signalled only if the proposed method is used.

4. In above examples, the video unit may refer to the video unit may refer to color component/sub-picture/slice/tile/coding tree unit (CTU)/CTU row/groups of CTU/coding unit (CU)/prediction unit (PU)/transform unit (TU)/coding tree block (CTB)/coding block (CB)/prediction block (PB)/transform block (TB)/a block/sub-block of a block/sub-region within a block/any other region that contains more than one sample or pixel.

5. Whether to and/or how to apply the disclosed methods above may be signaled at sequence level/group of pictures level/picture level/slice level/tile group level, such as in sequence header/picture header/SPS/VPS/DPS/DCI/PPS/APS/slice header/tile group header.

6. Whether to and/or how to apply the disclosed methods above may be signaled at PB/TB/CB/PU/TU/CU/VPDU/CTU/CTU row/slice/tile/sub-picture/other kinds of region contains more than one sample or pixel.

7. Whether to and/or how to apply the disclosed methods above may be dependent on coded information, such as block size, color format, single/dual tree partitioning, color component, slice/picture type.

6 Embodiment

6.1 Abstract

In this contribution, cross-component palette coding (CC-PLT) is proposed. CC-PLT employs a lookup table to record the corresponding chroma sample value, given a luma sample value. The lookup table is built based on neighboring reconstructed samples from multiple reference lines. For non 4:4:4 sequences, a multi-filter approach is employed to derive co-located luma values.

On top of ECM-3.1, simulation results are reported as:

Class TGM: AI: −1.37%, −1.08%, −1.68%, 105%, 103%; RA: −0.34%, −0.35%, −0.56%, 103%, 101%, Class F: AI: −0.20%, −0.44%, −0.36%, 105%, 102%; RA: −0.23%, −0.35%, −0.19%, 104%, 101%.

6.2 Introduction

In VVC and ECM, separate palette coding for luma and chroma components is used for the dual-tree structure, ignoring cross-component correlations.

6.3 Proposed Method

Cross-component palette coding (CC-PLT) is proposed to explore cross-component correlations, specifically for the dual-tree structure. A new prediction mode known as CC-PLT mode is introduced for chroma coding.

With the CC-PLT mode, chroma samples in the current chroma block are reconstructed as follows:

Step #1: Based on the reconstructed neighbouring samples, CC-PLT creates a cross-component look-up table (CC-LUT). Given a luma sample value, a corresponding chroma sample value is recorded in CC-LUT. CC-LUT could be derived from multiple reference lines.

Step #2: For each chroma sample, the co-located luma sample value, denoted as Yc is fetched as a key to retrieve a mapping chroma sample value in CC-LUT. If Yc cannot be found in CC-LUT, Yc±1, Yc±2 and Yc±3 are checked in order as keys to find the mapping chroma sample value. If none of the candidate keys are in CC-LUT, the mapping chroma sample value is set to be the average of the chroma values in CC-PLT.

Step #3: For each chroma sample, the mapping chroma sample value is output as the reconstructed value. Furthermore, in addition to the down-sampling filter in ECM, five candidate down-sampling filters corresponding with down-sampling locations Y1, Y2 . . . , Y5 as shown in FIG. 20 are introduced to generate the best co-located luma sample value for the YCbCr 4:2:0 color format. FIG. 20 illustrates an example diagram 2000 showing luma down-sampling positions. The encoder tries the candidate down-sampling filters and signals an index of the best filter to the decoder.

6.4 Experimental Results

The tests were implemented on top of ECM-3.1. The simulations were performed following the common test conditions. Table 5 shows the overall results for AI and RA tests compared to ECM-3.1. For these results, the look-up table is derived based on 8 chroma reference lines. It should be noted that the anchor has the palette coding (PLT) tool on.

TABLE 5

| | Y | U | V | EncT | DecT |
|---|---|---|---|---|---|
| Performance of the proposed method | | | | | |
| All Intra Main10 Over ECM-3.1 (with PLT on) | | | | | |
| Class F | −0.20% | −0.44% | −0.36% | 105% | 102% |
| Class TGM | −1.37% | −1.08% | −1.68% | 105% | 103% |
| Random Access Main 10 Over ECM-3.1 (with PLT on) | | | | | |
| Class F | −0.23% | −0.35% | −0.19% | 104% | 101% |
| Class TGM | −0.34% | −0.35% | −0.56% | 103% | 101% |

6.5 Conclusions

In this contribution, CC-PLT is proposed for screen content coding, which brings significant coding gains with a negligible complexity increase. It is recommended to study CC-PLT to EE2.

FIG. 21 illustrates a flowchart of a method 2100 for video processing in accordance with some embodiments of the present disclosure. The method 2100 may be implemented during a conversion between a target video block of a video and a bitstream of the video. As shown in FIG. 21, at block 2102, at least one mapping relationship between a first set of values of a first color component and a second set of values of a second color component is determined. At block 2104, a cross-component prediction of the target video block is determined based on the at least one mapping relationship. In this way, the cross-component prediction can be determined based on a mapping relationship between values of the first and second color components, and thus the coding effectiveness and coding efficiency can be improved.

At block 2106, the conversion is performed based on the second MVP candidate list. In some embodiments, the conversion may include encoding the target video block into the bitstream. Alternatively, or in addition, the conversion may include decoding the target video block from the bitstream.

In some embodiments, the first color component comprises a luma component, and the second color component comprises a chroma component.

In some embodiments, the at least one mapping relationship comprises at least one discrete mapping metric. For example, the at least one discrete mapping metric may comprise at least one discrete mapping function. That is, the at least one discrete mapping metric or mapping function may be used to derive the cross-component prediction.

In some embodiments, the at least one mapping relationship comprises a lookup table. The lookup table may be used to determine a predicted chroma values for a given luma value.

In some embodiments, at block 2102, a luma-chroma pair from boundary samples may be determined as an entry in the lookup table.

In some embodiments, the first set of values of the first color component comprises boundary luma sample values, and the second set of values of the second color component comprises corresponding chroma values.

In some embodiments, the first set of values of the first color component comprises luma sample values from a plurality of reference lines, and the second set of values of the second color component comprises corresponding chroma values.

In some embodiments, the first set of values of the first color component comprises luma sample values from a region of reconstructed image or video or a union of regions of a reconstructed image or video, and the second set of values of the second color component comprises corresponding chroma values.

In some embodiments, the method 2100 further comprises: including region information regarding the region or the union of regions in the bitstream. Alternatively, or in addition, in some embodiments, the method 2100 further comprises predefining the region information. The method 2100 may further comprise determining the region or the union of regions based on the region information. That is, the method to determine such region or regions could be implicit (pre-determined) or conveyed explicitly to the decoder.

In some embodiments, the method 2100 further comprising: updating the at least one mapping relationship based on a reconstructed region of an image or a video. For example, the mapping function is learnt on the fly by dynamically updating the mapping function as new regions of image or video are reconstructed.

In some embodiments, at block 2102, if a collocated luma block for a given chroma block employs intra block copy, a block vector (BV) for a collocated luma prediction unit is determined. A region in an image or a video maybe determined based on the BV. The at least one mapping relationship may be determined based on the region.

In some embodiments, the BV comprises a displacement to locate a chroma region used to determine the at least one mapping relationship.

In some embodiments, the method 2100 further comprises: if intra block copy is allowed for chroma, determining a merge candidate for the target video block; and determining a region to determine the at least one mapping relationship based on the merge candidate.

In some embodiments, the method 2100 further comprises: if a first luma value of the target video block is not included in the first set of values, determining a corresponding first chroma value of the target video block based on the at least one mapping relationship. That is, if the current block contains a luma value Y that is not in the input luma set, the chroma prediction may be determined based on the at least one mapping relationship.

In some embodiments, an average of an entire or a partial if the second set of values may be determined as the corresponding first chroma value.

In some embodiments, an input luma value may be determined by checking at least one candidate luma value in the first set of values. The corresponding first chroma value may be determined based on the input luma value.

In some embodiments, the at least one candidate luma value may be checked in an order.

In some embodiments, the method 2100 further comprises: determining the order based on at least one distance between the at least one candidate luma value and the first luma value, a closer distance corresponding a higher order.

In some embodiments, a first candidate luma value in the first set of values corresponding to the first luma value may be determined as the input luma value. A prediction of chroma value may be determined based on the first candidate luma value as the corresponding first chroma value. The first candidate luma value that can be found in the input luma set may be used to get the chroma prediction.

In some embodiments, the at least one candidate luma value comprises a sum of the first luma value with a first integer and a subtraction of the first luma value by the first integer. The first integer may comprise at least one of 1, 2 or 3. For example, Y±1, Y±2 and Y±3 may be used as the candidates.

In some embodiments, the corresponding first chroma value may be determined based on a metric of the second set of values or a metric of a subset of the second set of values.

By way of example, the metric comprises at least one of: a minimum metric, a maximum metric, or a mode matric.

In some embodiments, differences between the first set of values and the first luma value may be determined. A first candidate value with a minimum difference of the differences may be determined. A chroma value corresponding to the first candidate value in the mapping relationship may be determined as the corresponding first chroma value. For example, the closest luma value in the luma set is determined and its corresponding output is used as the predicted chroma value.

In some embodiments, the corresponding first chroma value may be determined by using the following metric:

$$C = (w1 * F(Y0) + w1 * F(Y1) + O)/(w1 + w2),$$

wherein F represents a mapping relationship, Y0 and Y1 are two luma values in the first set of values closest to the first luma value Y and Y0<Y<Y1, w1 and w2 are weighting values, and O is an integer. In some embodiments, w1 comprises 1, w2 comprises 1, and O comprises 1.

In some embodiments, the corresponding first chroma value may be determined as a default value.

In some embodiments, the method 2100 further comprises: if a plurality of chroma values is found in the at least one mapping relationship based on a given luma value, determining a corresponding chroma value for the given luma value based on the plurality of chroma values.

In some embodiments, a metric value may be determined based on the plurality of chroma values or a subset of the plurality of chroma values as the corresponding chroma value.

In some embodiments, the metric value comprises one of the following: an average value, a minimum value, or a maximum value.

In some embodiments, a most recent reconstructed chroma value of the plurality of chroma values may be determined as the corresponding chroma value.

In some embodiments, a given luma value is unique in a mapping relationship of the at least one mapping relationship.

In some embodiments, a mapping table between the first set of values of a luma color component and the second set of values of a chroma color component may be determined.

In some embodiments, a valid luma value in the mapping table corresponds to an entry in the table. By way of example, the valid luma value is in a range from 0 to $2^B-1$, B being a bit-depth.

In some embodiments, the mapping table comprises a mapped chroma prediction value corresponding to a luma value.

In some embodiments, the mapped chroma prediction value comprises a chroma value of a single chroma component.

In some embodiments, the mapped chroma prediction value comprises chroma values of a plurality of chroma components. By way of example, the plurality of chroma components comprises Cb and Cr.

In some embodiments, an entry in the mapping table comprises a pair of luma value and chroma value.

In some embodiments, an entry T [k] comprises {Y, C}, T [k] representing an entry in the mapping table T, Y representing a luma value, and C representing a chroma value.

In some embodiments, for a first entry T [k1]={Y1, C1} and a second entry T [k2]={Y2, C2} in the mapping table, if k1 is less than k2, T [k1] and T [k2] are in an order that Y1<Y2.

In some embodiments, the pair of luma value and chroma value comprises a chroma value of a single chroma component.

In some embodiments, the pair of luma value and chroma value comprises chroma values of a plurality of chroma components. By way of example, the plurality of chroma components comprises Cb and Cr.

In some embodiments, the method 2100 further comprises: including an indication in the bitstream to indicate whether to apply the method for the target video block. By way of example, the indication comprises a syntax element or a flag.

In some embodiments, the method 2100 further comprises: determining the indication based on a number of distinct colors in neighbors of the target video block or a number of distinct entries in a look-up table.

In some embodiments, the method 2100 further comprises: determining the indication based on a usage of dual-tree structure.

In some embodiments, the indication is conditionally included in the bitstream.

In some embodiments, the method 2100 further comprises: determining whether to or how to include the indication in the bitstream based on dimensions of the target video block.

In some embodiments, if at least one of the following conditions is met, it is determined to include the indication in the bitstream: a size of the target video block is greater than or no lower than a pre-defined size, a sum of a width and a height of the target video block is greater than or no lower than a pre-defined threshold, or a width of the target video block is greater than or no lower than a pre-defined width threshold, or a height of the target video block is greater than or no lower than a pre-defined height threshold.

In some embodiments, if at least one of the following conditions is met, it is determined to include the indication in the bitstream: a size of the target video block is lower than or no greater than a pre-defined size, a sum of a width and a height of the target video block is lower than or no greater than a pre-defined threshold, or a width of the target video block is lower than or no greater than a pre-defined width threshold, or a height of the target video block is lower than or no greater than a pre-defined height threshold.

In some embodiments, the method 2100 further comprises: determining a predicted or mapped chroma sample value based on the at least one mapping relationship; and determining a reconstructed sample value based on the predicted or mapped chroma sample value.

In some embodiments, a sum of the predicted or mapped chroma sample value and a residue value may be determined as the reconstructed sample value.

In some embodiments, the method 2100 further comprises: indicating the residue value in the bitstream.

In some embodiments, the residue value may be indicated from an encoder to a decoder.

In some embodiments, the residue value is transformed at the encoder and invers-transformed at the decoder.

In some embodiments, a block of the residue is entropy-coded as in a further mode.

In some embodiments, the further mode comprises one of the following: an intra mode, an inter mode, or an intra block copy (IBC) mode.

In some embodiments, the video comprises a number of distinct colors. That is, the video comprises a class of screen content video under consideration that comprises of regions with few distinct colors.

According to embodiments of the present disclosure, a non-transitory computer-readable recording medium is proposed. A bitstream of a video is stored in the non-transitory computer-readable recording medium. The bitstream of the video is generated by a method performed by a video processing apparatus. According to the method, at least one mapping relationship between a first set of values of a first color component and a second set of values of a second color component is determined. A cross-component prediction of a target video block of the video is determined based on the at least one mapping relationship. The bitstream is generated based on the cross-component prediction.

According to embodiments of the present disclosure, a method for storing a media presentation of a media is proposed. In the method, at least one mapping relationship between a first set of values of a first color component and a second set of values of a second color component is determined. A cross-component prediction of a target video block of the video is determined based on the at least one mapping relationship. The bitstream is generated based on the cross-component prediction. The bitstream is stored in a non-transitory computer-readable recording medium.

Figure 22:
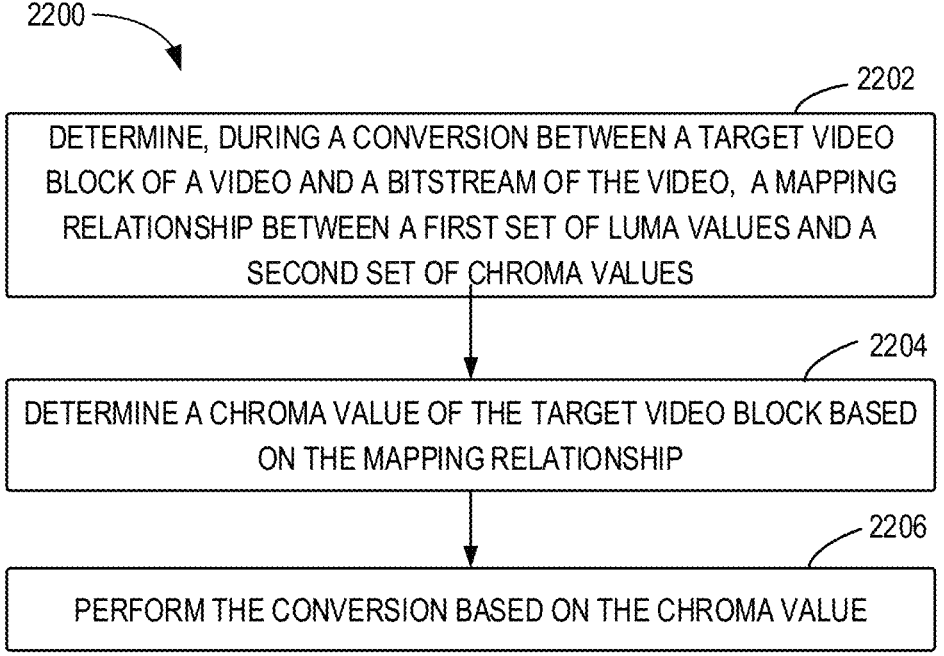
FIG. 22 illustrates another flowchart of a method for video processing in accordance with some embodiments of the present disclosure.

FIG. 22 illustrates a flowchart of a method 2200 for video processing in accordance with some embodiments of the present disclosure. The method 2200 may be implemented during a conversion between a target video block of a video and a bitstream of the video. As shown in FIG. 22, at block 2202, a mapping relationship between a first set of luma values and a second set of chroma values is determined. At block 2204, a chroma value of the target video block is determined based on the mapping relationship. In this way, a chroma value of the target video block may be determined based on a mapping relationship between luma values and chroma values, and thus the coding effectiveness and coding efficiency can be improved.

At block 2206, the conversion is performed based on the chroma value. In some embodiments, the conversion may include encoding the target video block into the bitstream. Alternatively, or in addition, the conversion may include decoding the target video block from the bitstream.

In some embodiments, the method 2200 further comprises: coding an index of the mapping relationship in a bypassed way. That is, the coding of the index map may be bypassed.

In some embodiments, the method 2200 further comprises: if a size of a chroma palette is N, N being an integer, determining N centroids by classifying collocated luma samples into N clusters. In some embodiments, the collocated luma samples may be classified by using a k-means clustering.

In some embodiments, a centroid is uniquely mapped to a chroma palette entry.

In some embodiments, the method 2200 further comprises: quantizing a collocated luma sample to a nearest centroid of the N centroids; and determining a chroma prediction or chroma reconstruction based on a chroma palette entry associated with the nearest centroid.

In some embodiments, the method 2200 further comprises: including an association between centroids and palette entries in the bitstream. By way of example, the association may be indicated or conveyed to a decoder.

In some embodiments, if a first value of a collocated luma sample is found in an input or domain of the mapping relationship, the mapping relationship is applied for the collocated luma sample.

In some embodiments, the method 2200 further comprises: if a first value of a collocated luma sample is not found in an input or domain of the mapping relationship, including a palette index in the bitstream.

In some embodiments, the method 2200 further comprises: including a flag indicating to use a cross-component prediction mode for the target video block in the bitstream. By way of example, the flag comprises a syntax element.

In some embodiments, the method 2200 further comprises: determining the flag based on whether a palette coding is enabled for the target video block.

In some embodiments, the method 2200 further comprises: determining the flag based on syntax elements of a palette coding.

In some embodiments, the syntax elements comprise a number of reused palette entries, or an escape flag.

In some embodiments, the method 2200 further comprises: determining the flag based on a usage of a dual-tree structure.

In some embodiments, the method 2200 further comprises: including the flag conditionally.

In some embodiments, the method 2200 further comprises: determining whether to or how to include the flag in the bitstream based on dimensions of the target video block.

In some embodiments, if at least one of the following conditions is met, it is determined to include the flag in the bitstream: a size of the target video block is greater than or no lower than a pre-defined size, a sum of a width and a height of the target video block is greater than or no lower than a pre-defined threshold, or a width of the target video block is greater than or no lower than a pre-defined width threshold, or a height of the target video block is greater than or no lower than a pre-defined height threshold.

Alternatively, in some embodiments, if at least one of the following conditions is met, it is determined to include the flag in the bitstream: a size of the target video block is lower than or no greater than a pre-defined size, a sum of a width and a height of the target video block is lower than or no greater than a pre-defined threshold, or a width of the target video block is lower than or no greater than a pre-defined width threshold, or a height of the target video block is lower than or no greater than a pre-defined height threshold.

According to embodiments of the present disclosure, a non-transitory computer-readable recording medium is proposed. A bitstream of a video is stored in the non-transitory computer-readable recording medium. The bitstream of the video is generated by a method performed by a video processing apparatus. According to the method, a mapping relationship between a first set of luma values and a second set of chroma values is determined. A chroma value of a target video block of the video is determined based on the mapping relationship. The bitstream is generated based on the chroma value.

According to embodiments of the present disclosure, a method for storing a media presentation of a media is proposed. In the method, a mapping relationship between a first set of luma values and a second set of chroma values is determined. A chroma value of a target video block of the video is determined based on the mapping relationship. The bitstream is generated based on the chroma value. The bitstream is stored in a non-transitory computer-readable recording medium.

FIG. 23 illustrates a flowchart of a method 2300 for video processing in accordance with some embodiments of the present disclosure. The method 2300 may be implemented during a conversion between a target video block of a video and a bitstream of the video. As shown in FIG. 23, at block 2302, a plurality of luma samples of the target video block sharing a chroma value is determined. By way of example, for non 4:4:4 content such as 4:2:0 content, four luma values sharing a single chroma value may be determined. At block 2304, a down-sampled luma value of the target video block is determined based on the plurality of luma samples. At block 2306, a corresponding chroma value of the down-sampled luma value is determined based on a mapping relationship between a first set of luma values and a second set of chroma values. In some embodiments, the mapping relationship may be determined by using block 2102 of method 2100.

In this way, a down-sampled luma value can be determined based on a plurality of luma values sharing a chroma value. A corresponding chroma value of the down-sampled luma value can be determined based on a mapping relationship between luma values and chroma values. For non 4:4:4 content, the cross-component prediction models in regular intra mode and the model to be disclosed in palette mode is based on downsized luma samples. The accuracy of the model depends on the down-sampling operation. Therefore, determining the down-sampled luma value based on the plurality of luma values sharing a chroma value can be used to achieve an accurate model derivation. The coding effectiveness and coding efficiency can be thus improved.

At block 2308, the conversion is performed based on the corresponding chroma value. In some embodiments, the conversion may include encoding the target video block into the bitstream. Alternatively, or in addition, the conversion may include decoding the target video block from the bitstream.

In some embodiments, at block 2304, a linear combination of the plurality of luma samples may be determined as the down-sampled luma value.

In some embodiments, at block 2304, an average of the plurality of luma samples may be determined as the down-sampled luma value. For example, this corresponds to location marked $C_1$ in FIG. 19.

In some embodiments, an average of a subset of the plurality of luma samples may be determined as the down-sampled luma value. In some embodiments, the subset of the plurality of luma samples comprises top two luma samples. For an example case with top two samples, this corresponds to location marked $C_2$ in FIG. 19.

In some embodiments, the method 2300 further comprises: determining a collocated luma sample based on additional neighboring luma samples. In one example, the above-mentioned method may be extended to include additional neighboring luma samples in deriving co-located luma sample.

In some embodiments, the down-sampled luma value may be determined by applying a filter involving a non-linear operation on the plurality of luma samples. In one example, the above-mentioned methods could be extended to include filters that involve non-linear operations.

In some embodiments, the method 2300 further comprises: including a flag indicating whether the method is applied for the target video block in the bitstream. By way of example, the flag comprises a syntax element.

In some embodiments, the method 2300 further comprising: including a filter index in the bitstream, the filter index indicating a filter used for the target video block.

In some embodiments, the method 2300 further comprising: determining the filter index based on a filter chosen by a neighbor block of the target video block.

In some embodiments, if the method is applied for the target video block, the filter index may be included in the bitstream.

According to embodiments of the present disclosure, a non-transitory computer-readable recording medium is proposed. A bitstream of a video is stored in the non-transitory computer-readable recording medium. The bitstream of the video is generated by a method performed by a video processing apparatus. According to the method, a plurality of luma samples of a target video block of the video sharing a chroma value is determined. A down-sampled luma value of the target video block is determined based on the plurality of luma samples. A corresponding chroma value of the down-sampled luma value is determined based on a mapping relationship between a first set of luma values and a second set of chroma values. The bitstream is generated based on the corresponding chroma value.

According to embodiments of the present disclosure, a method for storing a media presentation of a media is proposed. In the method, a plurality of luma samples of a target video block of the video sharing a chroma value is determined. A down-sampled luma value of the target video block is determined based on the plurality of luma samples. A corresponding chroma value of the down-sampled luma value is determined based on a mapping relationship between a first set of luma values and a second set of chroma values. The bitstream is generated based on the corresponding chroma value. The bitstream is stored in a non-transitory computer-readable recording medium.

In some embodiments, the target video block comprises one of the following: a video unit referring to a color component, a sub-picture, a slice, a tile, a coding tree unit (CTU), a CTU row, a group of CTUs, a coding unit (CU), a prediction unit (PU), a transform unit (TU), a coding tree block (CTB), a coding block (CB), a prediction block (PB), a transform block (TB), a block, a sub-block of a block, a sub-region within a block, a region containing a plurality of samples or pixels.

It is to be understood that the above method 2100, method 2200, and/or method 2300 may be used in combination or separately. Any suitable combination of these methods may be applied. Scope of the present disclosure is not limited in this regard.

In some embodiments, information on applying the methods 2100, 2200, and/or 2300 may be included in the bitstream. For example, the information may comprise at least one of: whether to apply the methods 2100, 2200, and/or 2300, or how to apply the methods 2100, 2200, and/or 2300. In other words, whether to and/or how to apply the methods 2100, 2200, and/or 2300 may be signaled in the bitstream.

In some embodiments, the information may be included at one of: a sequence level, a group of pictures level, a picture level, a slice level, or a tile group level.

In some embodiments, the information may be included in a sequence header, a picture header, a sequence parameter set (SPS), a Video Parameter Set (VPS), a decoded parameter set (DPS), Decoding Capability Information (DCI), a Picture Parameter Set (PPS), an Adaptation Parameter Set (APS), a slice header, or a tile group header.

In some embodiments, the information may be included in a region containing a plurality of samples or a plurality of pixels.

In some embodiments, the region comprises one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, or a subpicture.

In some embodiments, the information may be determined based on coded information. By way of example, the coded information may comprise at least one of: a block size, a colour format, a single or dual tree partitioning, a colour component, a slice type, or a picture type.

By using these methods 2100, 2200, and/or 2300 separately or in combination, the cross-component prediction of the target video block may be improved. In this way, the coding effectiveness and coding efficiency can be improved.

Implementations of the present disclosure can be described in view of the following clauses, the features of which can be combined in any reasonable manner.

Clause 1. A method for video processing, comprising: determining, during a conversion between a target video block of a video and a bitstream of the video, at least one mapping relationship between a first set of values of a first color component and a second set of values of a second color component; determining a cross-component prediction of the target video block based on the at least one mapping relationship; and performing the conversion based on the cross-component prediction.

Clause 2. The method of clause 1, wherein the first color component comprises a luma component, and the second color component comprises a chroma component.

Clause 3. The method of clause 1 or clause 2, wherein the at least one mapping relationship comprises at least one discrete mapping metric.

Clause 4. The method of any of clauses 1-3, wherein the at least one mapping relationship comprises a lookup table for determining a predicted chroma values for a given luma value.

Clause 5. The method of clause 4, wherein determining the at least one mapping relationship comprises: determining a luma-chroma pair from boundary samples as an entry in the lookup table.

Clause 6. The method of clause 4 or clause 5, wherein the first set of values of the first color component comprises boundary luma sample values, and the second set of values of the second color component comprises corresponding chroma values.

Clause 7. The method of any of clauses 1-4, wherein the first set of values of the first color component comprises luma sample values from a plurality of reference lines, and the second set of values of the second color component comprises corresponding chroma values.

Clause 8. The method of any of clauses 1-4, wherein the first set of values of the first color component comprises luma sample values from a region of reconstructed image or video or a union of regions of a reconstructed image or video, and the second set of values of the second color component comprises corresponding chroma values.

Clause 9. The method of clause 8, further comprising: including region information regarding the region or the union of regions in the bitstream; or predefining the region information; and determining the region or the union of regions based on the region information.

Clause 10. The method of any of clauses 1-9, further comprising: updating the at least one mapping relationship based on a reconstructed region of an image or a video.

Clause 11. The method of any of clauses 1-10, wherein determining the at least one mapping relationship between a first set of values and a second set of values comprises: if a collocated luma block for a given chroma block employs intra block copy, determining a block vector (BV) for a collocated luma prediction unit; determining a region in an image or video based on the BV; and determining the at least one mapping relationship based on the region.

Clause 12. The method of clause 11, wherein the BV comprises a displacement to locate a chroma region used to determine the at least one mapping relationship.

Clause 13. The method of any of clauses 1-12, further comprising: if intra block copy is allowed for chroma, determining a merge candidate for the target video block; and determining a region to determine the at least one mapping relationship based on the merge candidate.

Clause 14. The method of any of clauses 1-13, further comprising: if a first luma value of the target video block is not included in the first set of values, determining a corresponding first chroma value of the target video block based on the at least one mapping relationship.

Clause 15. The method of clause 14, wherein determining the corresponding first chroma value based on the at least one mapping relationship comprises: determining an average of an entire or a partial if the second set of values as the corresponding first chroma value.

Clause 16. The method of clause 14, wherein determining the corresponding first chroma value based on the at least one mapping relationship comprises: determining an input luma value by checking at least one candidate luma value in the first set of values; and determining the corresponding first chroma value based on the input luma value.

Clause 17. The method of clause 16, wherein determining an input luma value by checking at least one candidate luma value in the first set of values comprises: checking the at least one candidate luma value in an order.

Clause 18. The method of clause 17, further comprising: determining the order based on at least one distance between the at least one candidate luma value and the first luma value, a closer distance corresponding a higher order.

Clause 19. The method of any of clauses 16-18, wherein determining an input luma value by checking at least one candidate luma value in the first set of values comprises: determining a first candidate luma value in the first set of values corresponding to the first luma value as the input luma value; and wherein determining the corresponding first chroma value based on the input luma value comprises: determining a prediction of chroma value based on the first candidate luma value as the corresponding first chroma value.

Clause 20. The method of any of clauses 16-19, wherein the at least one candidate luma value comprises a sum of the first luma value with a first integer and a subtraction of the first luma value by the first integer, the first integer comprising at least one of 1, 2 or 3.

Clause 21. The method of clause 14, wherein determining the corresponding first chroma value based on the at least one mapping relationship comprises: determining the corresponding first chroma value based on a metric of the second set of values or a metric of a subset of the second set of values.

Clause 22. The method of clause 21, wherein the metric comprises at least one of: a minimum metric, a maximum metric, or a mode matric.

Clause 23. The method of clause 14, wherein determining the corresponding first chroma value based on the at least one mapping relationship comprises: determining differences between the first set of values and the first luma value; determining a first candidate value with a minimum difference of the differences; and determining a chroma value corresponding to the first candidate value in the mapping relationship as the corresponding first chroma value.

Clause 24. The method of clause 14, wherein determining the corresponding first chroma value based on the at least one mapping relationship comprises: determining the corresponding first chroma value by using the following metric: C=(w1*F (Y0)+w1*F (Y1)+O)/(w1+w2), wherein F represents a mapping relationship, Y0 and Y1 are two luma values in the first set of values closest to the first luma value Y and Y0<Y<Y1, w1 and w2 are weighting values, and O is an integer.

Clause 25. The method of clause 24, wherein w1 comprises 1, w2 comprises 1, and O comprises 1.

Clause 26. The method of clause 14, wherein determining the corresponding first chroma value based on the at least one mapping relationship comprises: determining the corresponding first chroma value as a default value.

Clause 27. The method of any of clauses 1-26, further comprising: if a plurality of chroma values is found in the at least one mapping relationship based on a given luma value, determining a corresponding chroma value for the given luma value based on the plurality of chroma values.

Clause 28. The method of clause 27, wherein determining the corresponding chroma value comprises: determining a metric value based on the plurality of chroma values or a subset of the plurality of chroma values as the corresponding chroma value.

Clause 29. The method of clause 28, wherein the metric value comprises one of the following: an average value, a minimum value, or a maximum value.

Clause 30. The method of clause 27, wherein determining the corresponding chroma value comprises: determining a most recent reconstructed chroma value of the plurality of chroma values as the corresponding chroma value.

Clause 31. The method of any of clauses 1-30, wherein a given luma value is unique in a mapping relationship of the at least one mapping relationship.

Clause 32. The method of any of clauses 1-31, wherein determining at least one mapping relationship comprises determining a mapping table between the first set of values of a luma color component and the second set of values of a chroma color component.

Clause 33. The method of clause 32, wherein a valid luma value in the mapping table corresponds to an entry in the table.

Clause 34. The method of clause 33, wherein the valid luma value is in a range from 0 to $2^B-1$, B being a bit-depth.

Clause 35. The method of any of clauses 32-34, wherein the mapping table comprises a mapped chroma prediction value corresponding to a luma value.

Clause 36. The method of clause 35, wherein the mapped chroma prediction value comprises a chroma value of a single chroma component.

Clause 37. The method of clause 35, wherein the mapped chroma prediction value comprises chroma values of a plurality of chroma components.

Clause 38. The method of clause 37, wherein the plurality of chroma components comprises Cb and Cr.

Clause 39. The method of any of clauses 32-38, wherein an entry in the mapping table comprises a pair of luma value and chroma value.

Clause 40. The method of clause 39, wherein an entry T [k] comprises {Y, C}, T [k] representing an entry in the mapping table T, Y representing a luma value, and C representing a chroma value.

Clause 41. The method of clause 40, wherein for a first entry T [k1]={Y1, C1} and a second entry T [k2]={Y2, C2} in the mapping table, if k1 is less than k2, T [k1] and T [k2] are in an order that Y1<Y2.

Clause 42. The method of any of clauses 39-41, wherein the pair of luma value and chroma value comprises a chroma value of a single chroma component.

Clause 43. The method of any of clauses 39-41, wherein the pair of luma value and chroma value comprises chroma values of a plurality of chroma components.

Clause 44. The method of clause 43, wherein the plurality of chroma components comprises Cb and Cr.

Clause 45. The method of any of clauses 1-44, further comprising: including an indication in the bitstream to indicate whether to apply the method for the target video block.

Clause 46. The method of clause 45, wherein the indication comprises a syntax element or a flag.

Clause 47. The method of clause 45 or clause 46, further comprising: determining the indication based on a number of distinct colors in neighbors of the target video block or a number of distinct entries in a look-up table.

Clause 48. The method of clause 45 or clause 46, further comprising: determining the indication based on a usage of dual-tree structure.

Clause 49. The method of any of clauses 45-48, wherein the indication is conditionally included in the bitstream.

Clause 50. The method of any of clauses 45-49, further comprising: determining whether to or how to include the indication in the bitstream based on dimensions of the target video block.

Clause 51. The method of clause 50, wherein determining whether to or how to include the indication in the bitstream comprises: if at least one of the following conditions is met, determining to include the indication in the bitstream: a size of the target video block is greater than or no lower than a pre-defined size, a sum of a width and a height of the target video block is greater than or no lower than a pre-defined threshold, or a width of the target video block is greater than or no lower than a pre-defined width threshold, or a height of the target video block is greater than or no lower than a pre-defined height threshold.

Clause 52. The method of clause 50, wherein determining whether to or how to include the indication in the bitstream comprises: if at least one of the following conditions is met, determining to include the indication in the bitstream: a size of the target video block is lower than or no greater than a pre-defined size, a sum of a width and a height of the target video block is lower than or no greater than a pre-defined threshold, or a width of the target video block is lower than or no greater than a pre-defined width threshold, or a height of the target video block is lower than or no greater than a pre-defined height threshold.

Clause 53. The method of any of clauses 1-52, further comprising: determining a predicted or mapped chroma sample value based on the at least one mapping relationship; and determining a reconstructed sample value based on the predicted or mapped chroma sample value.

Clause 54. The method of clause 53, wherein determining the reconstructed sample value based on the predicted or mapped chroma sample value comprises: determining a sum of the predicted or mapped chroma sample value and a residue value as the reconstructed sample value.

Clause 55. The method of clause 54, further comprising: indicating the residue value in the bitstream.

Clause 56. The method of clause 55, wherein indicating the residue value in the bitstream comprises indicating the residue value from an encoder to a decoder.

Clause 57. The method of clause 56, wherein the residue value is transformed at the encoder and invers-transformed at the decoder.

Clause 58. The method any of clauses 54-57, wherein a block of the residue is entropy-coded as in a further mode.

Clause 59. The method of clause 58, wherein the further mode comprises one of the following: an intra mode, an inter mode, or an intra block copy (IBC) mode.

Clause 60. The method of any of clauses 1-59, wherein the video comprises regions with a number of distinct colors.

Clause 61. A method for video processing, comprising: determining, during a conversion between a target video block of a video and a bitstream of the video, a mapping relationship between a first set of luma values and a second set of chroma values; determining a chroma value of the target video block based on the mapping relationship; and performing the conversion based on the chroma value.

Clause 62. The method of clause 61, further comprising: coding an index of the mapping relationship in a bypassed way.

Clause 63. The method of clause 61 or clause 62, further comprising: if a size of a chroma palette is N, N being an integer, determining N centroids by classifying collocated luma samples into N clusters.

Clause 64. The method of clause 63, wherein classifying collocated luma samples into N clusters comprises: classifying the collocated luma samples by using a k-means clustering.

Clause 65. The method of clause 63 or clause 64, wherein a centroid is uniquely mapped to a chroma palette entry.

Clause 66. The method of any of clauses 63-65, further comprising: quantizing a collocated luma sample to a nearest centroid of the N centroids; and determining a chroma prediction or chroma reconstruction based on a chroma palette entry associated with the nearest centroid.

Clause 67. The method of clause 66, further comprising: including an association between centroids and palette entries in the bitstream.

Clause 68. The method of clause 67, wherein including the association in the bitstream comprises indicating the association to a decoder.

Clause 69. The method of any of clauses 61-68, wherein if a first value of a collocated luma sample is found in an input or domain of the mapping relationship, the mapping relationship is applied for the collocated luma sample.

Clause 70. The method of any of clauses 61-68, further comprising: if a first value of a collocated luma sample is not found in an input or domain of the mapping relationship, including a palette index in the bitstream.

Clause 71. The method of any of clauses 61-70, further comprising: including a flag indicating to use a cross-component prediction mode for the target video block in the bitstream.

Clause 72. The method of clause 71, wherein the flag comprises a syntax element.

Clause 73. The method of clause 71 or clause 72, further comprising: determining the flag based on whether a palette coding is enabled for the target video block.

Clause 74. The method of clause 71 or clause 72, further comprising: determining the flag based on syntax elements of a palette coding.

Clause 75. The method of clause 74, wherein the syntax elements comprise a number of reused palette entries, or an escape flag.

Clause 76. The method of clause 71 or clause 72, further comprising: determining the flag based on a usage of a dual-tree structure.

Clause 77. The method of any of clauses 71-76, further comprising: including the flag conditionally.

Clause 78. The method of any of clauses 71-77, further comprising: determining whether to or how to include the flag in the bitstream based on dimensions of the target video block.

Clause 79. The method of clause 78, wherein determining whether to or how to include the flag in the bitstream comprises: if at least one of the following conditions is met, determining to include the flag in the bitstream: a size of the target video block is greater than or no lower than a pre-defined size, a sum of a width and a height of the target video block is greater than or no lower than a pre-defined threshold, or a width of the target video block is greater than or no lower than a pre-defined width threshold, or a height of the target video block is greater than or no lower than a pre-defined height threshold.

Clause 80. The method of clause 78, wherein determining whether to or how to include the flag in the bitstream comprises: if at least one of the following conditions is met, determining to include the flag in the bitstream: a size of the target video block is lower than or no greater than a pre-defined size, a sum of a width and a height of the target video block is lower than or no greater than a pre-defined threshold, or a width of the target video block is lower than or no greater than a pre-defined width threshold, or a height of the target video block is lower than or no greater than a pre-defined height threshold.

Clause 80. The method of clause 77, wherein determining whether to or how to include the flag in the bitstream comprises: if at least one of the following is met, determining to include the flag in the bitstream: a width of the target video block is greater than or lower than or lower than or no greater than a pre-defined width threshold, or a height of the target video block is greater than or lower than or lower than or no greater than a pre-defined height threshold.

Clause 81. A method for video processing, comprising: determining, during a conversion between a target video block of a video and a bitstream of the video, a plurality of luma samples of the target video block sharing a chroma value; determining a down-sampled luma value of the target video block based on the plurality of luma samples; determining a corresponding chroma value of the down-sampled luma value based on a mapping relationship between a first set of luma values and a second set of chroma values; and performing the conversion based on the corresponding chroma value.

Clause 82. The method of clause 81, wherein determining the down-sampled luma value based on the plurality of luma samples comprises: determining a linear combination of the plurality of luma samples as the down-sampled luma value.

Clause 83. The method of clause 81 or clause 82, wherein determining the down-sampled luma value based on the plurality of luma samples comprises: determining an average of the plurality of luma samples as the down-sampled luma value.

Clause 84. The method of clause 81 or clause 82, wherein determining the down-sampled luma value based on the plurality of luma samples comprises: determining an average of a subset of the plurality of luma samples as the down-sampled luma value.

Clause 85. The method of clause 84, wherein the subset of the plurality of luma samples comprises top two luma samples.

Clause 86. The method of any of clauses 81-85, further comprising: determining a collocated luma sample based on additional neighboring luma samples.

Clause 87. The method of any of clauses 81-86, wherein determining the down-sampled luma value based on the plurality of luma samples comprises: determining the down-sampled luma value by applying a filter involving a non-linear operation on the plurality of luma samples.

Clause 88. The method of any of clauses 81-87, further comprising: including a flag indicating whether the method is applied for the target video block in the bitstream.

Clause 89. The method of clause 88, wherein the flag comprises a syntax element.

Clause 90. The method of any of clauses 81-89, further comprising: including a filter index in the bitstream, the filter index indicating a filter used for the target video block.

Clause 91. The method of clause 90, further comprising: determining the filter index based on a filter chosen by a neighbor block of the target video block.

Clause 92. The method of clause 90 or clause 91, wherein including the filter index comprises: if the method is applied for the target video block, including the filter index in the bitstream.

Clause 93. The method of any of clauses 1-92, wherein the target video block comprises one of the following: a video unit referring to a color component, a sub-picture, a slice, a tile, a coding tree unit (CTU), a CTU row, a group of CTUs, a coding unit (CU), a prediction unit (PU), a transform unit (TU), a coding tree block (CTB), a coding block (CB), a prediction block (PB), a transform block (TB), a block, a sub-block of a block, a sub-region within a block, a region containing a plurality of samples or pixels.

Clause 94. The method of any of clauses 1-93, further comprising: including information on applying the method in the bitstream.

Clause 95. The method of clause 94, wherein the information comprises at least one of: whether to apply the method, or how to apply the method.

Clause 96. The method of clause 94 or clause 95, wherein the information is indicated at one of: a sequence level, a group of pictures level, a picture level, a slice level, or a tile group level.

Clause 97. The method of any of clauses 94-96, wherein the information is indicated in a sequence header, a picture header, a sequence parameter set (SPS), a Video Parameter Set (VPS), a decoded parameter set (DPS), Decoding Capability Information (DCI), a Picture Parameter Set (PPS), an Adaptation Parameter Set (APS), a slice header, or a tile group header.

Clause 98. The method of any of clauses 94-97, wherein the information is indicated in a region containing a plurality of samples or pixels.

Clause 99. The method of clause 98, wherein the region comprising one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, or a subpicture.

Clause 100. The method of any of clauses 94-99, further comprising: determining the information based on coded information.

Clause 101. The method of clause 100, wherein the coded information comprises at least one of: a block size, a colour format, a single or dual tree partitioning, a colour component, a slice type, or a picture type.

Clause 102. The method of any of clauses 1-101, wherein the conversion includes encoding the target video block into the bitstream.

Clause 103. The method of any of clauses 1-101, wherein the conversion includes decoding the target video block from the bitstream.

Clause 104. An apparatus for processing video data comprising a processor and a non-transitory memory with instructions thereon, wherein the instructions upon execution by the processor, cause the processor to perform a method in accordance with any of clauses 1-103.

Clause 105. A non-transitory computer-readable storage medium storing instructions that cause a processor to perform a method in accordance with any of clauses 1-103.

Clause 106. A non-transitory computer-readable recording medium storing a bitstream of a video which is generated by a method performed by a video processing apparatus, wherein the method comprises: determining at least one mapping relationship between a first set of values of a first color component and a second set of values of a second color component; determining a cross-component prediction of a target video block of the video based on the at least one mapping relationship; and generating the bitstream based on the cross-component prediction.

Clause 107. A method for storing a bitstream of a video, comprising: determining at least one mapping relationship between a first set of values of a first color component and a second set of values of a second color component; determining a cross-component prediction of a target video block of the video based on the at least one mapping relationship; generating the bitstream based on the cross-component prediction; and storing the bitstream in a non-transitory computer-readable recording medium.

Clause 108. A non-transitory computer-readable recording medium storing a bitstream of a video which is generated by a method performed by a video processing apparatus, wherein the method comprises: determining a mapping relationship between a first set of luma values and a second set of chroma values; determining a chroma value of a target video block of the video based on the mapping relationship; and generating the bitstream based on the chroma value.

Clause 109. A method for storing a bitstream of a video, comprising: determining a mapping relationship between a first set of luma values and a second set of chroma values; determining a chroma value of a target video block of the video based on the mapping relationship; generating the bitstream based on the chroma value; and storing the bitstream in a non-transitory computer-readable recording medium.

Clause 110. A non-transitory computer-readable recording medium storing a bitstream of a video which is generated by a method performed by a video processing apparatus, wherein the method comprises: determining a plurality of luma samples of a target video block of the video sharing a chroma value; determining a down-sampled luma value of the target video block based on the plurality of luma samples; determining a corresponding chroma value of the down-sampled luma value based on a mapping relationship between a first set of luma values and a second set of chroma values; and generating the bitstream based on the corresponding chroma value.

Clause 111. A method for storing a bitstream of a video, comprising: determining a plurality of luma samples of a target video block of the video sharing a chroma value; determining a down-sampled luma value of the target video block based on the plurality of luma samples; determining a corresponding chroma value of the down-sampled luma value based on a mapping relationship between a first set of luma values and a second set of chroma values; generating the bitstream based on the corresponding chroma value; and storing the bitstream in a non-transitory computer-readable recording medium.

Example Device

Figure 24:
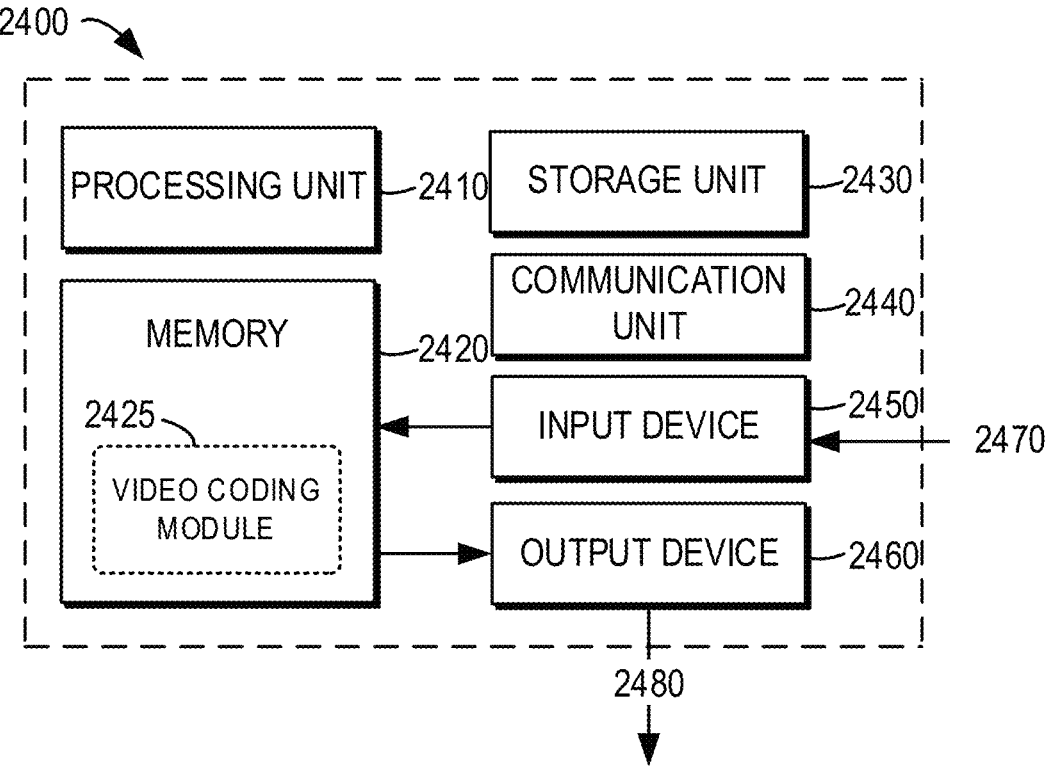
FIG. 24 illustrates a block diagram of a computing device in which various embodiments of the present disclosure can be implemented.

FIG. 24 illustrates a block diagram of a computing device 2400 in which various embodiments of the present disclosure can be implemented. The computing device 2400 may be implemented as or included in the source device 110 (or the video encoder 114 or 200) or the destination device 120 (or the video decoder 124 or 300).

It would be appreciated that the computing device 2400 shown in FIG. 24 is merely for purpose of illustration, without suggesting any limitation to the functions and scopes of the embodiments of the present disclosure in any manner.

As shown in FIG. 24, the computing device 2400 includes a general-purpose computing device 2400. The computing device 2400 may at least comprise one or more processors or processing units 2410, a memory 2420, a storage unit 2430, one or more communication units 2440, one or more input devices 2450, and one or more output devices 2460.

In some embodiments, the computing device 2400 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 2400 can support any type of interface to a user (such as "wearable" circuitry and the like).

The processing unit 2410 may be a physical or virtual processor and can implement various processes based on programs stored in the memory 2420. In a multi-processor system, multiple processing units execute computer executable instructions in parallel so as to improve the parallel processing capability of the computing device 2400. The processing unit 2410 may also be referred to as a central processing unit (CPU), a microprocessor, a controller or a microcontroller.

The computing device 2400 typically includes various computer storage medium. Such medium can be any medium accessible by the computing device 2400, including, but not limited to, volatile and non-volatile medium, or detachable and non-detachable medium. The memory 2420 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 2430 may be any detachable or non-detachable medium and may include a machine-readable medium such as a memory, flash memory drive, magnetic disk or another other media, which can be used for storing information and/or data and can be accessed in the computing device 2400.

The computing device 2400 may further include additional detachable/non-detachable, volatile/non-volatile memory medium. Although not shown in FIG. 24, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 2440 communicates with a further computing device via the communication medium. In addition, the functions of the components in the computing device 2400 can be implemented by a single computing cluster or multiple computing machines that can communicate via communication connections. Therefore, the computing device 2400 can operate in a networked environment using a logical connection with one or more other servers, networked personal computers (PCs) or further general network nodes.

The input device 2450 may be one or more of a variety of input devices, such as a mouse, keyboard, tracking ball, voice-input device, and the like. The output device 2460 may be one or more of a variety of output devices, such as a display, loudspeaker, printer, and the like. By means of the communication unit 2440, the computing device 2400 can further communicate with one or more external devices (not shown) such as the storage devices and display device, with one or more devices enabling the user to interact with the computing device 2400, or any devices (such as a network card, a modem and the like) enabling the computing device 2400 to communicate with one or more other computing devices, if required. Such communication can be performed via input/output (I/O) interfaces (not shown).

In some embodiments, instead of being integrated in a single device, some or all components of the computing device 2400 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 2400 may be used to implement video encoding/decoding in embodiments of the present disclosure. The memory 2420 may include one or more video coding modules 2425 having one or more program instructions. These modules are accessible and executable by the processing unit 2410 to perform the functionalities of the various embodiments described herein.

In the example embodiments of performing video encoding, the input device 2450 may receive video data as an input 2470 to be encoded. The video data may be processed, for example, by the video coding module 2425, to generate an encoded bitstream. The encoded bitstream may be provided via the output device 2460 as an output 2480.

In the example embodiments of performing video decoding, the input device 2450 may receive an encoded bitstream as the input 2470. The encoded bitstream may be processed, for example, by the video coding module 2425, to generate decoded video data. The decoded video data may be provided via the output device 2460 as the output 2480.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, during a conversion between a target video block of a video and a bitstream of the video, at least one mapping relationship between a first set of values of a first color component and a second set of values of a second color component;

determining a cross-component prediction of the target video block based on the at least one mapping relationship; and performing the conversion based on the cross-component prediction, wherein the method further comprises:

if intra block copy is allowed for chroma, determining a merge candidate for the target video block; and determining a region to determine the at least one mapping relationship based on the merge candidate.

2. The method of claim 1, wherein the first color component comprises a luma component, and the second color component comprises a chroma component.

3. The method of claim 1, wherein the at least one mapping relationship comprises at least one discrete mapping metric.

4. The method of claim 1, wherein the at least one mapping relationship comprises a lookup table for determining a predicted chroma values for a given luma value.

5. The method of claim 4, wherein determining the at least one mapping relationship comprises:

determining a luma-chroma pair from boundary samples as an entry in the lookup table.

6. The method of claim 4, wherein the first set of values of the first color component comprises boundary luma sample values, and the second set of values of the second color component comprises corresponding chroma values.

7. The method of claim 1, wherein the first set of values of the first color component comprises luma sample values from a plurality of reference lines, and the second set of values of the second color component comprises corresponding chroma values.

8. The method of claim 1, wherein the first set of values of the first color component comprises luma sample values from a region of reconstructed image or video or a union of regions of a reconstructed image or video, and the second set of values of the second color component comprises corresponding chroma values.

9. The method of claim 8, wherein region information regarding the region or the union of regions is included in the bitstream or predefined, and wherein the method further comprises:

determining the region or the union of regions based on the region information.

10. The method of claim 1, further comprising:

updating the at least one mapping relationship based on a reconstructed region of an image or a video.

11. The method of claim 1, wherein determining the at least one mapping relationship between a first set of values and a second set of values comprises:

if a collocated luma block for a given chroma block employs intra block copy, determining a block vector (BV) for a collocated luma prediction unit;

determining a region in an image or video based on the BV; and determining the at least one mapping relationship based on the region, wherein the BV comprises a displacement to locate a chroma region used to determine the at least one mapping relationship.

12. The method of claim 1, further comprising:

determining a plurality of luma samples of the target video block sharing a chroma value;

determining a down-sampled luma value of the target video block based on the plurality of luma samples; and determining a corresponding chroma value of the down-sampled luma value based on a mapping relationship between a first set of luma values and a second set of chroma values.

13. The method of claim 12, wherein determining the down-sampled luma value based on the plurality of luma samples comprises:

determining a linear combination of the plurality of luma samples as the down-sampled luma value.

14. The method of claim 12 wherein determining the down-sampled luma value based on the plurality of luma samples comprises:

determining an average of the plurality of luma samples as the down-sampled luma value.

15. The method of claim 1, wherein the conversion includes encoding the target video block into the bitstream.

16. The method of claim 1, wherein the conversion includes decoding the target video block from the bitstream.

17. An apparatus for processing video data comprising a processor and a non-transitory memory with instructions thereon, wherein the instructions upon execution by the processor, cause the processor to:

determine, during a conversion between a target video block of a video and a bitstream of the video, at least one mapping relationship between a first set of values of a first color component and a second set of values of a second color component;

determine a cross-component prediction of the target video block based on the at least one mapping relationship; and perform the conversion based on the cross-component prediction, wherein the processor is further caused to:

if intra block copy is allowed for chroma, determine a merge candidate for the target video block; and determine a region to determine the at least one mapping relationship based on the merge candidate.

18. A non-transitory computer-readable storage medium storing instructions that cause a processor to perform a method performed by a video processing apparatus, wherein the method comprises:

determining, during a conversion between a target video block of a video and a bitstream of the video, at least one mapping relationship between a first set of values of a first color component and a second set of values of a second color component;

determining a cross-component prediction of the target video block based on the at least one mapping relationship; and performing the conversion based on the cross-component prediction, wherein the method further comprises:

if intra block copy is allowed for chroma, determining a merge candidate for the target video block; and determining a region to determine the at least one mapping relationship based on the merge candidate.

19. A non-transitory computer-readable recording medium storing a bitstream of a video which is generated by a method performed by a video processing apparatus, wherein the method comprises:

determining at least one mapping relationship between a first set of values of a first color component and a second set of values of a second color component;

determining a cross-component prediction of a target video block of the video based on the at least one mapping relationship; and generating the bitstream based on the cross-component prediction, wherein the method further comprises:

if intra block copy is allowed for chroma, determining a merge candidate for the target video block; and determining a region to determine the at least one mapping relationship based on the merge candidate.

* * * * *